(12) United States Patent
Yoda

(10) Patent No.: US 8,107,679 B2
(45) Date of Patent: Jan. 31, 2012

(54) HORSE POSITION INFORMATION ANALYZING AND DISPLAYING METHOD

(75) Inventor: Ikushi Yoda, Ibaraki (JP)

(73) Assignee: Yamaguchi Cinema Co., Ltd., Tokyo (JP)

( * ) Notice: Subject to any disclaimer, the term of this patent is extended or adjusted under 35 U.S.C. 154(b) by 926 days.

(21) Appl. No.: 12/088,729

(22) PCT Filed: Sep. 29, 2006

(86) PCT No.: PCT/JP2006/319390
§ 371 (c)(1),
(2), (4) Date: Mar. 31, 2008

(87) PCT Pub. No.: WO2007/037350
PCT Pub. Date: Apr. 5, 2007

(65) Prior Publication Data
US 2009/0042628 A1 Feb. 12, 2009

(30) Foreign Application Priority Data
Sep. 29, 2005 (JP) .................................. 2005-285702

(51) Int. Cl.
*G06K 9/00* (2006.01)
(52) U.S. Cl. ...................................................... 382/103
(58) Field of Classification Search .......... 382/100–107; 348/143, 157, 169–172; 250/206–206.3, 250/559.01–559.32
See application file for complete search history.

(56) References Cited

U.S. PATENT DOCUMENTS
5,513,103 A * 4/1996 Charlson ..................... 700/93
6,141,041 A * 10/2000 Carlbom et al. ............. 348/169
2006/0056654 A1 3/2006 Yoda et al.

FOREIGN PATENT DOCUMENTS
| JP | 1-130288 A | 5/1989 |
| JP | 2002-063577 A | 2/2002 |
| JP | 2003-216955 A | 7/2003 |
| JP | 2004-46647 A | 2/2004 |
| JP | 2004-58737 A | 2/2004 |
| WO | 2004-011314 A1 | 2/2004 |

OTHER PUBLICATIONS

International Search Report of PCT/JP2006/319390, date of mailing Oct. 24, 2006.

* cited by examiner

*Primary Examiner* — Atiba O Fitzpatrick
(74) *Attorney, Agent, or Firm* — Westerman, Hattori, Daniels & Adrian, LLP

(57) ABSTRACT

The purpose of the present invention is, in a horse race or a motorboat race, to display the progress of the race (trail) of each horse, by obtaining analysis data of a plural number of patrol images provided around the race course, by acquiring position information of each horse at the moment and by tracking the specific horse through judging similarity between consecutive pictures of said patrol image. The position information analyzing and displaying method for each horse or boat or the like of the present invention, for continuously captured race images, identifies each horse or boat or the like by similarity analysis and tracks continuously the trail of each horse or boat or the like in said racing images, and also analyzes said position information of each horse or boat or the like by using the positional relationship with the fixed position information in said images, in order to display the trail of each horse or boat or the like. A template of which size matches the image size of each horse or boat is used for said identification, and each horse or boat or the like is identified within said template. Here, said template is hexagonal and the size of said template is variable according to the size of each horse or boat on the picture.

18 Claims, 42 Drawing Sheets

HORSE POSITION INFORMATION ANALYZING AND DISPLAYING METHOD

FIELD OF THE INVENTION

The present invention relates to a method of analyzing, and a method of displaying, the position information of each object such as a horse or a boat in the racing image at a horse racing, a motorcycle race or a motorboat race, and a method of correctly extracting the image of each object such as the horse or the boat in the image analysis.

BACKGROUND OF THE INVENTION

In a horse racing and the like, a track TV system or a relay broadcast TV system has been generally used for the audience to watch the status of the race.

It has been difficult, however, for such TV systems to trace the race progress of each horse individually, and it has been especially impossible for such TV systems to display the trace of each horse including its temporary rank during the race.

The race progress of each horse is precious data for predicting its following race, and is also used for monitoring rule violations such as course disturbance. In horse racing, for example, disturbing the course of other horses is a rule violation, and TV cameras are installed at several points around the race track in order to record sequentially the racing development of each horse during the race for obtaining patrol images by which whether there is any rule violation such as course disturbance or not can be judged after the race. Although the patrol images are presently used for judging during a race whether there is a rule violation or not, the images can be utilized as a decision basis after the race, if the detailed trace of each horse in the race can be displayed on the image.

Tipster newspapers and the like anticipate the ranking of starter horses by grasping characteristics of each horse through past races to define each one as a front runner or a stretch runner, considering handicaps, racing distance, ground conditions, likes and dislikes of each horse for clockwise or counter clockwise. However, since exact race progress information of each horse for past races cannot be available, anticipation considering the race progress (course taking) of each horse is impossible presently. This is because conventionally there were no effective methods of analyzing position information of each horse or each boat in horse racing or motorboat racing.

In the U.S., passing order and time of each horse at every critical furlong are manually measured for public announcement as recorded data, but this manual method is neither efficient nor capable of acquiring continuous record, only capable of acquiring intermittent data at every furlong at best.

In Hong Kong Racetrack, for example, an attempt is carried out wherein detection antennae are embedded in the racetrack and a transmitter is attached to each horse, to obtain the position information of each horse by detecting the horse that passes the antennae. An example of a horse position displaying device using such a transmitter is known as JP,2005-24315,A.

Since malfunctioning easily occurs in receiving signals from such a transmitter, and since the cost for newly required equipment is large, however, many problems must be solved for actual utilization of such a device.

Also, since there are no data for the past races while accumulation of new data takes time, even if such a device is installed, one or two years may be required before it can be applied for actual race anticipation. Also, obtained data will be insufficient as the race information, since it lacks data before the device is installed. In addition, the required cost is too large for small-scale racetracks such as local racetracks to introduce.

An idea of acquiring and displaying the position information of each racehorse from a plural number of TV cameras installed around the racetrack is shown in JP,6-165882,A.

The content of the official gazette is summarized hereunder; FIG. 1 is a whole block diagram showing an example of the movement reproducing equipment in the official gazette. This movement reproducing equipment reproduces the states of several horses, 9a, 9b and 9c, running in the racetrack 6 by moving horse models, 13a, 13b and 13c. Several TV cameras 7A-7L are installed in the racetrack 6 along the tracks where horses run. And the system is constituted so that image data captured by the TV cameras 7A-7L is respectively transmitted to each detection device 8A-8L. Detecting devices 8A-8L detect the image data of the running horses when the data is transmitted from the TV camera (7H, for example) that catches running horses 9a, 9b and 9c among TV cameras 7A-7L, and transmit the image data of horses 9a, 9b and 9c is to the object movement judging device 1. Judgement criterion registration equipment 5 is connected to object movement judging device 1, and colors of the riding wear and the cap and the like of each jockey, for example, are registered in object movement judging device 1 by using judgement criterion registration equipment 5, to be memorized beforehand.

Object movement judging device 1 compares registered data inputted from judgement criterion registration equipment 5 with detected data inputted from detecting devices 8A-8L, analyzes and traces movement of each running horse 9a, 9b and 9c. Each saddlecloth number of running horse 9a, 9b and 9c may be registered in object movement judging device 1 by judgement criterion registration equipment 5. Judgement criterion registration equipment 5 which is actually composed of a portable TV camera and others, approaches each horse and each jockey before the race is started, captures and registers the information one by one. A movement capturing means which captures movement position of moving objects such as running horse 9a, 9b and 9c is composed of said TV cameras 7A-7L and detecting devices 8A-8L.

Object movement judging device 1 transmits the trace result data of the movement of running horses 9a, 9b and 9c to movement data generating device 2. Movement data generating device 2 is installed as a unit in a game machine comprising running plane 12, horse models 13a, 13b, 13c and others.

Although it is difficult to capture the racing trail of a running horse, and it is especially technically difficult to track one target horse among the congested horse group since it is necessary to recognize the identity of the horse between image frames, no technical solution means is disclosed in the above-mentioned official gazette, JP,6-165882,A. Also, this official gazette is incomplete showing only an idea, since it does not disclose how to calculate the absolute position of the target horse.

Patent Reference 1: JP, 2005-24315, A
Patent reference 2: JP, 1994-65882, A

DESCRIPTION OF THE INVENTION

Problems to be Solved by the Invention

The present invention was made in view of above-mentioned problems, and its purpose is to provide methods and means of analyzing and displaying the trail of a specific horse in a race, and displaying the race progress of each horse, by obtaining analysis data of a plural number of patrol images provided around the race course, by acquiring position information of each horse at the moment from said analysis data and by tracking the specific horse through judging similarity between consecutive pictures of said patrol image.

In said Analyzing and displaying methods for each horse or each boat, automation of properly clipping images of each horse or each boat is important in order to analyze position information of each horse or each boat by using racing images of horse racing, a motorboat race and the like.

The present invention further relates to improvement in the image analysis of the above-mentioned proposal, aiming at providing with an extraction algorithm which performs more precisely and automatically clipping work for images of horses and the like.

Means for Solving the Problems

In order to solve the problems mentioned above, the position information analyzing and displaying method of the present invention for each horse or boat or the like is a method of analyzing and displaying position information of each horse or boat by using racing images in horse racing or a motorboat race, characterized in that, for continuously captured race images, the method identifies each horse, boat or the like by similarity analysis, tracks continuously the trail of each horse or boat or the like in said racing images, analyzes said position information of each horse or boat or the like by using positional relationship with the fixed position information of a racetrack, a motorboat race place and the like in said images, and displays the trail of each horse or boat or the like.

The position information analyzing and displaying method of the present invention for each horse or boat is further characterized in that the methods compares said identification information of each horse or boat or the like on each picture with identification information of each horse or boat or the like on the following picture, and identifies the object in the following picture that has large similarity with the object in the preceding picture as the same horse or the same boat.

The position information analyzing and displaying method of the present invention for each horse or boat is further characterized in that said identification by similarity is performed by recognition using color information, a template of which size matches the image size of each horse or boat is used for identification of each horse or boat in said racing images and identification of each horse, boat or the like is performed within said template.

The position information analyzing and displaying method of the present invention for each horse or boat are further characterized in that said template is hexagonal and the size of said template is variable according to the size of each horse or boat on the picture.

The position information analyzing and displaying method of the present invention for each horse or boat are further characterized in that said recognition using color information for the object image is performed to determine the clipping area in a search area larger than said template size, and the size of the template is determined in the clipping area according to the size that matches to the image of each horse, boat and the like.

The position information analyzing and displaying method of the present invention for each horse or boat is further characterized in that, in said template, only the upper portion except for leg portion of a horse is used as the area for similarity analysis, and in said template, areas corresponding to the head of each horse and the head of each jockey are weighted for the similarity analysis.

The race trail displaying method of the present invention is characterized in that the method displays a race trail of each horse or boat or the like in the race by analyzing said position information of each horse or boat or the like by using position information analysis method for each horse or boat, and by displaying continuously said position information of each horse or boat or the like.

The race trail displaying method of the invention is characterized in that race trail data used for said race trail displaying method is delivered to a personal computer, a personal digital assistant or a cellular phone via the Internet, the race progress is reproduced by CG using said delivered data, and the reproduced animated racing image is displayed on the personal computer, the personal digital assistant or the cellular phone.

Or, in order to attain aforementioned purposes, the position information analyzing and displaying method of the present invention for each horse or boat or the like is a method of analyzing and displaying position information of each horse or boat or the like by using racing images in the horse racing or the motorboat race, characterized in that, for continuously captured race images, the method identifies each horse or boat or the like by similarity analysis, tracks continuously the trail of each horse or boat or the like in said racing images, analyzes said position information of each horse or boat or the like by using the positional relationship with the fixed position information of a racetrack, a motorboat race place and the like in said images, and displays the trails of each horse or boat or the like, wherein, clipping images of each horse or boat or the like are extracted from said continuously captured race images, by deleting unnecessary portions other than the race course from the images.

The position information analyzing and displaying method for each horse, boat or the like of the present invention is further characterized in that, among the position coordinates of each horse or boat or the like in said preceding picture in the continuously captured race images, all image information for the area a specified position behind the tail end horse position is set to zero as said unnecessary portion. The position information analyzing and displaying method for each horse, boat or the like of the present invention is further characterized in that, the Rachi (fence surrounding the race track) portion is extracted from said continuously captured race images and all image information outside of said Rachi is set to 0.

The position information analyzing and displaying method for each horse, boat or the like of the present invention is further characterized in that RGB information on said images is changed into HSV information, a histogram is created from each component number of said HSV information, the ratio of the area of said clipping image and the area of the whole image is calculated, a threshold in said histogram by which the boundary between the clipping image and a background image is calculated according to said area ratio, and image information other than the background color is extracted from said image according to said threshold.

The position information analyzing and displaying method for each horse, boat or the like of the present invention is further characterized in that a template which matches the image size of said each horse, boat or the like is used for identification of each horse or boat or the like in said racing images, each horse or boat or the like is identified within said template, logical multiplication (AND) is calculated between the mask of the horse or the like that is obtained by said identification and said extracted image information other than background color, and noises other than clipping images of a horse or the like are cleared.

The position information analyzing and displaying method for each horse, boat or the like of the present invention is further characterized in that said template is hexagonal and the size of said template is variable according to the size of each horse or boat or the like on the image, or the size of said template is determined by performing said recognition using color information for the object image to determine the clipping area in a search area larger than said template size, and by determining the size of said template in the clipping area according to the size that matches to the image of each horse, boat and the like.

The position information analyzing and displaying method for each horse, boat or the like of the present invention is further characterized in that, in said template, only the upper portion except for leg portion of a horse is used as the area for similarity analysis, and in said template, areas corresponding to the head of each horse and the head of each jockey are weighted for the similarity analysis.

EFFECTS OF THE INVENTION

The present invention has a prominent effect in providing useful race data easily as data for referee judgment in a race or data for next race anticipation, since, without installing new facilities, it can calculate the position of a horse and the like in a race from patrol images that are currently captured, and it can reproduce the race progress easily based on said data which was difficult formerly.

Furthermore, in order to track an individual horse in captured racing images, the same horse can be extracted from a group of running horses and can be identified easily between the consecutive pictures, which was difficult formerly, by analyzing the similarity function between consecutive pictures using the template matched with the target size. Accordingly, without new special facility investment, precious data to know the race progress can be obtained easily by analyzing patrol images which are presently available, as explained above.

Furthermore, since the amount of data of the position information in said race is extraordinarily small as compared to the amount of data of the racing image itself, if only said position information data is delivered and the racing image is reproduced by using CG and the like at the receiving side, even a cellular phone or a dial-up line can readily accept the data, for the amount of data delivered becomes small. Therefore, instead of using image transmission which was conventionally difficult, a cellular phone or a personal digital assistant can be easily used for enjoying a racing image.

Furthermore, since the present invention deletes unnecessary portion other than the horse image beforehand, data processing time can be shortened. Also, the risk of erroneous recognition of an image of a fence or a gate as an image of a horse and the like is eliminated.

Therefore, since clipping of an image of a horse and the like is performed with sufficient precision by the present invention, processing accuracy of similarity comparison and others becomes higher, so that accuracy in identification processing for the same horse between the preceding picture and the following picture, resulting in reduction of errors in identification. This contributes to reducing mismatch of a template, resulting in time and effort for re-mating the template manually can be saved.

This shortens the analysis time dramatically, producing an effect that the position information analysis result, that is, the course taking information for each horse can be provided immediately after the race is finished.

DESCRIPTION OF REFERENCE NUMERALS

1 Object Movement Judging Device
2 Moving Data Generating Device
3 Coordinate Detecting Device
4 Drive Command Generating Device
21, 22 Trails of horses
31 Starting Gate
32 Goal
33 4th Corner Camera
34 1st Corner Camera
35 2nd Corner Camera
36 3rd Corner Camera

DETAILED DESCRIPTION OF THE PREFERRED EMBODIMENT

The present invention is explained in detail hereunder based on an embodiment with reference to drawings.

Embodiment

Figure 1:
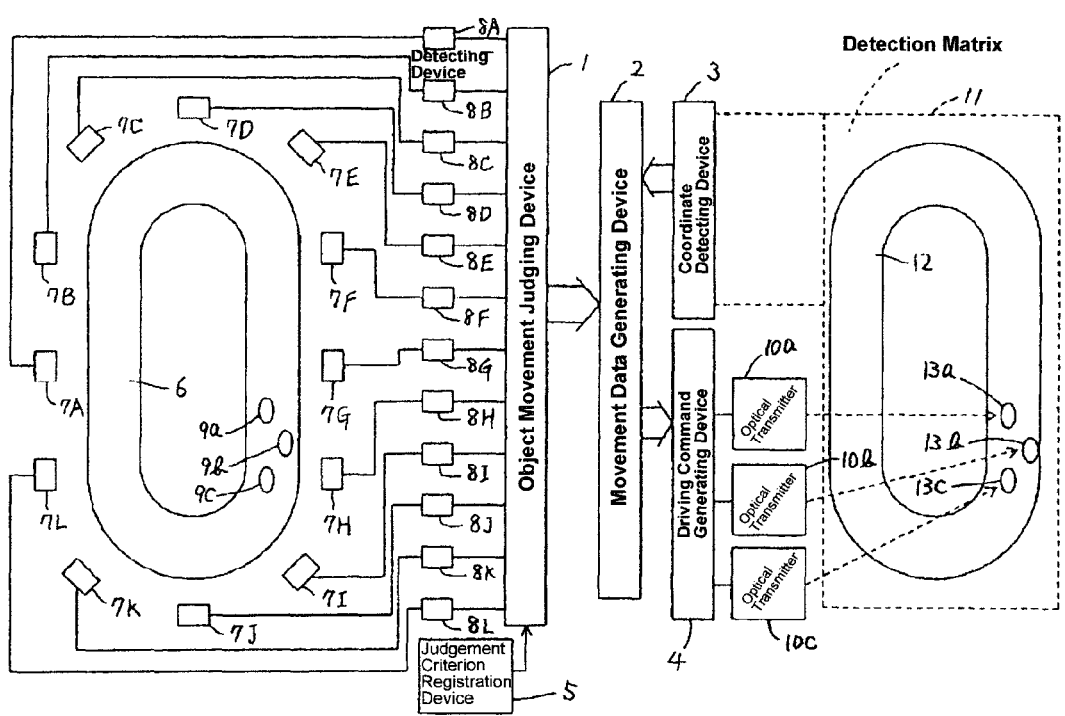
FIG. 1 shows a conventional example.
Figure 2:
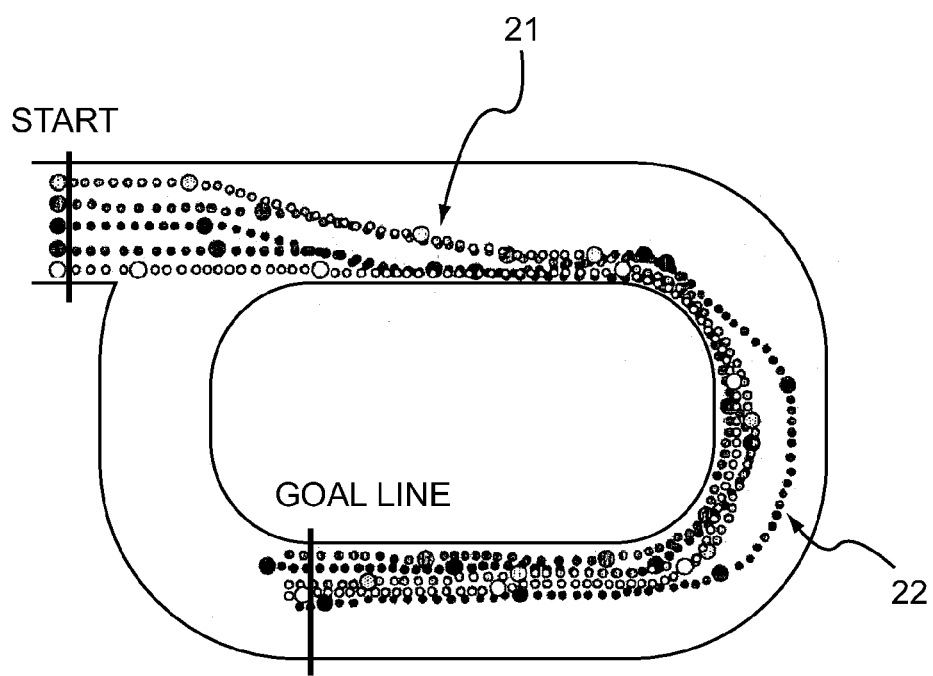
FIG. 2 shows a modeled trail of a horse in a horse race.

FIG. 2 shows a picture which models the trails of actual horses in a horse race.

In FIG. 2, each racehorse started from the gate all at once tends to run along a nearer side of the fence as shown by 21 of FIG. 2. The front runner often takes a strategy of keeping a slow pace while maintaining the front position so that the power is saved for the run from the 4th corner. However, for example, there are some horses which aim the first prize, by going outside from the 4th corner as shown by 22, putting out a last spurt from the outmost position, and passing the front runner at a stretch. This is a strategy of going out of the group to get clear off intending that vigor of acceleration at the last spurt should not be weakened, even if it is somewhat disadvantageous as for distance, since running in a group is restricted. There is a clockwise course or a counter-clockwise course depending on the racetrack.

Figure 3:
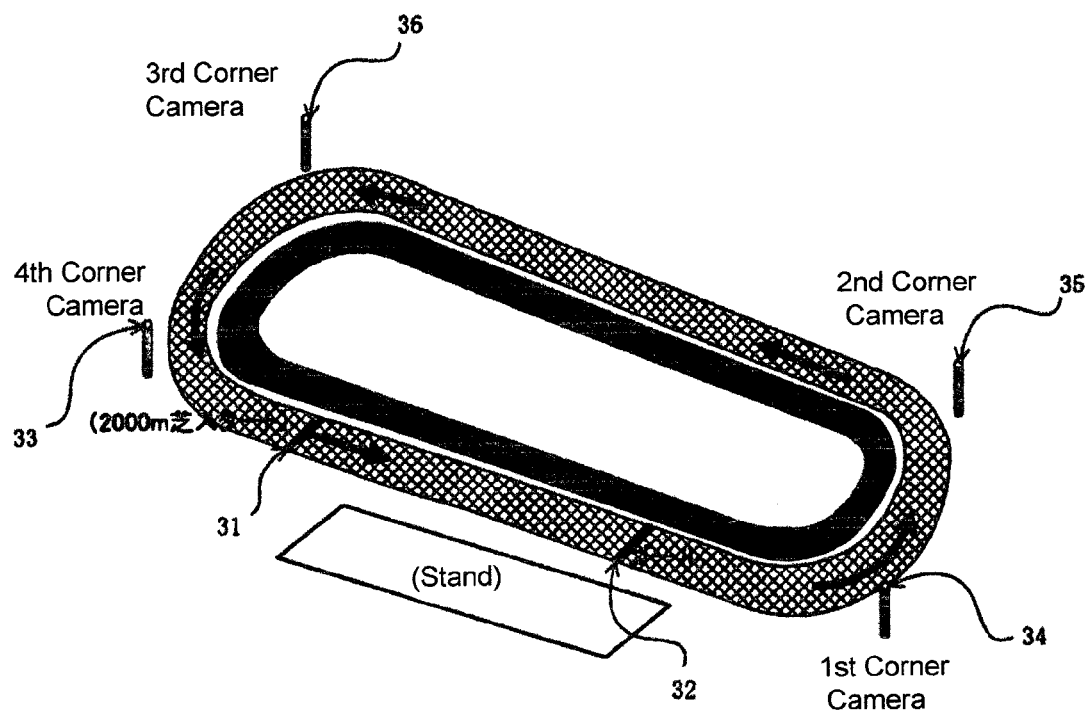
FIG. 3 shows an example of the course layout of a racetrack.

Thus, since various strategies according to the character of a horse or the thinking of a jockey influence the progress of the race, and since such tactics during the progress of the race also greatly influences victory or defeat, a trail of such a course taking of the horse becomes precious data for horse race fans to anticipate the next race. There is a rule in the horse race that any horse must not interfere with the courses of other horses during the race, and if the rule is violated by a horse, the horse will be ranked to a later order or disqualified. For this reason, each race, is monitored with a plural number of imaging cameras installed around the racetrack as shown in FIG. 3, for example, whether there was any violation of a rule or not is always checked by referees after the race, based on the captured images (henceforth patrol images). Aforementioned images are captured by a plural number of said imaging cameras synchronized each other, and the racing status of each horse is captured from various angles to be used as judging data.

Similar situation exists also in a motorboat race, where data for starting and data for turning at mark 1 become important reference data for judgement in a motorboat race. That is, presently, the situation of turning of each boat is monitored by only playing on a VTR, and judging such as whether the boat interfered with other boats by its unsuitable turning operation or not is made. A caution or a suspension may be imposed in some cases as the result of the judgement, but sometimes VTR images may be unclear for decision, so that the trail displaying method of the present invention is useful also as an auxiliary means for the judgement.

In a boat race, how to enter a corner is especially difficult for a racing boat, and if the boat comes behind another after turning around the corner, the position of the following boat becomes disadvantageous by the influence of waves generated by the leading boat. Therefore, it is difficult for a player to decide at which point before the corner to slow down the boat in order to pass the corner while keeping ahead of others, so that the skill of such course taking affects greatly the race result. Thus, the trail data of course taking becomes greatly helpful for reflection by the player, as well as for an anticipation of the next race result.

An example of a course layout of a racetrack is shown in FIG. 3. FIG. 3 shows an example of a counter-clockwise course. In the case of a race on a 2000 m dirt course, for example, racehorses start from starting gate 31, take one round counter-clockwise as shown by the arrow, and the rank is determined at goal 32.

On patrol towers around the course, television cameras 33, 34, 35 and 36 which capture patrol images are installed as already mentioned, and all of these cameras are synchronized to capture the horses running in the race. The horse group running near the goal, for example, is captured from rear side by 4th corner camera 33, from front side by 1st corner camera 34, and from oblique directions by 2nd corner camera 35 and 3rd corner camera 36, respectively. All the images of each camera are collected and recorded in the center, and all the images are played after the race in a judgement room for the race to be judged.

Figure 11:
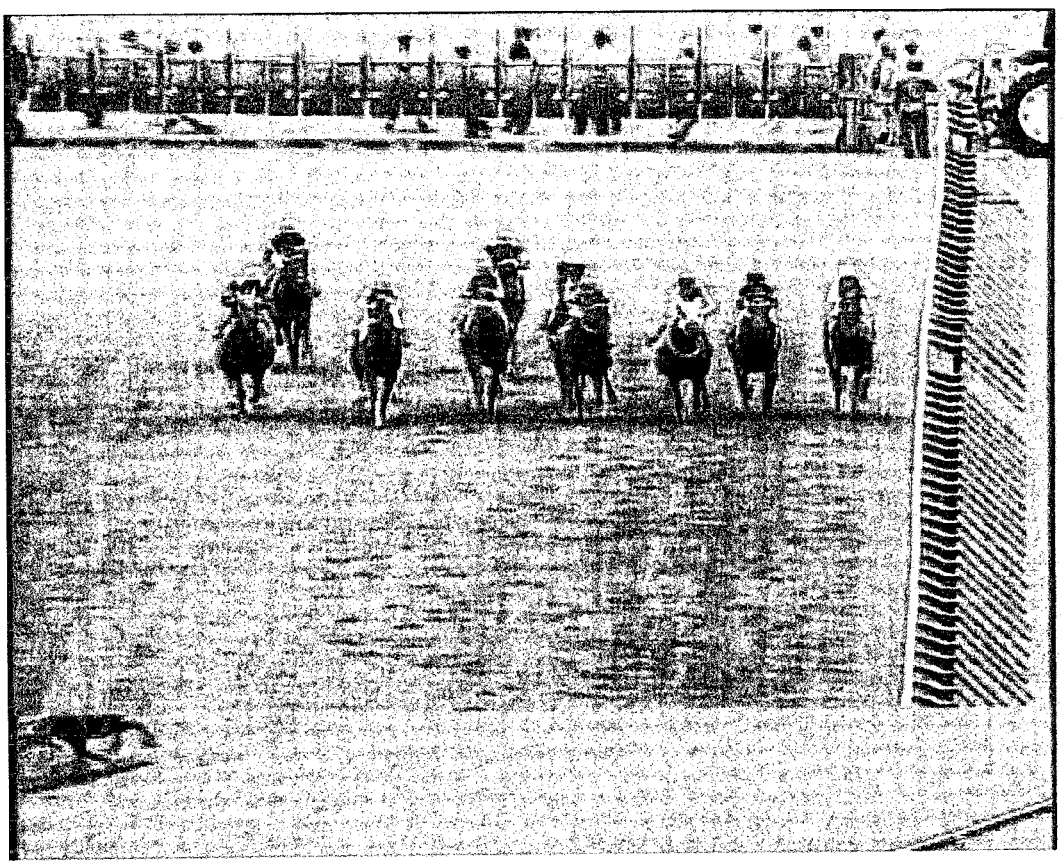
FIG. 11 shows an example of a patrol image immediately after start.
Figure 12:
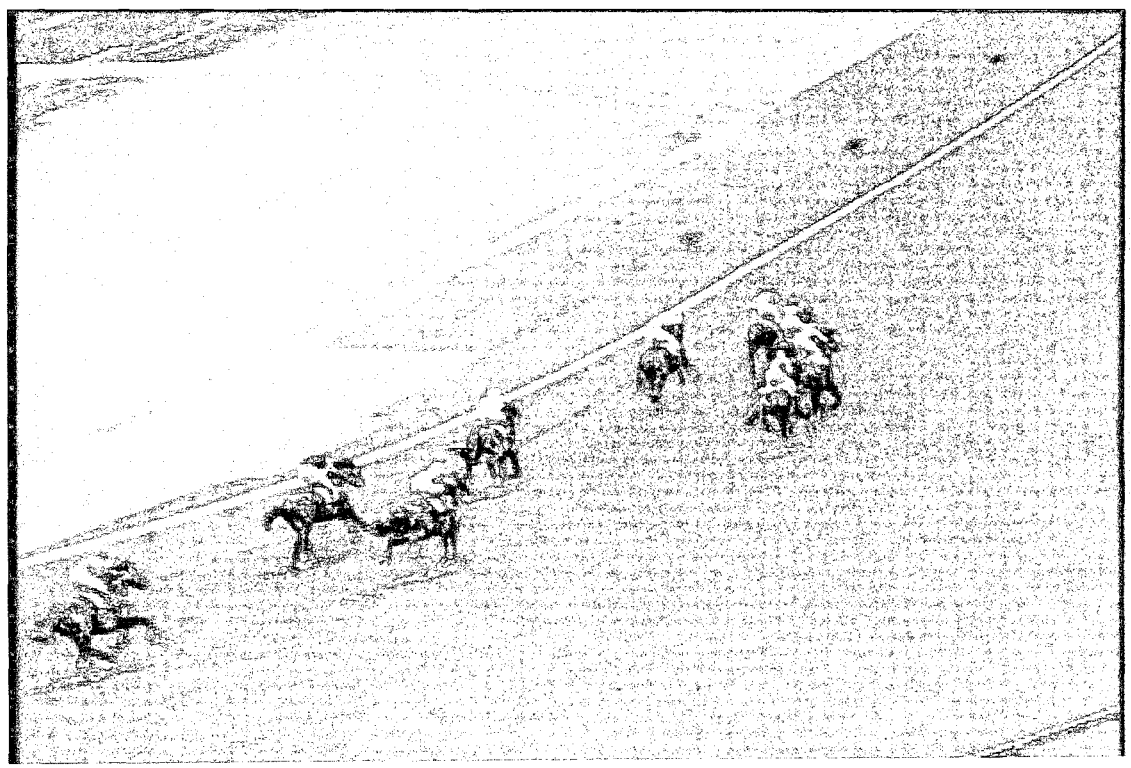
FIG. 12 shows an example of a patrol image near the 2nd corner.
Figure 13:
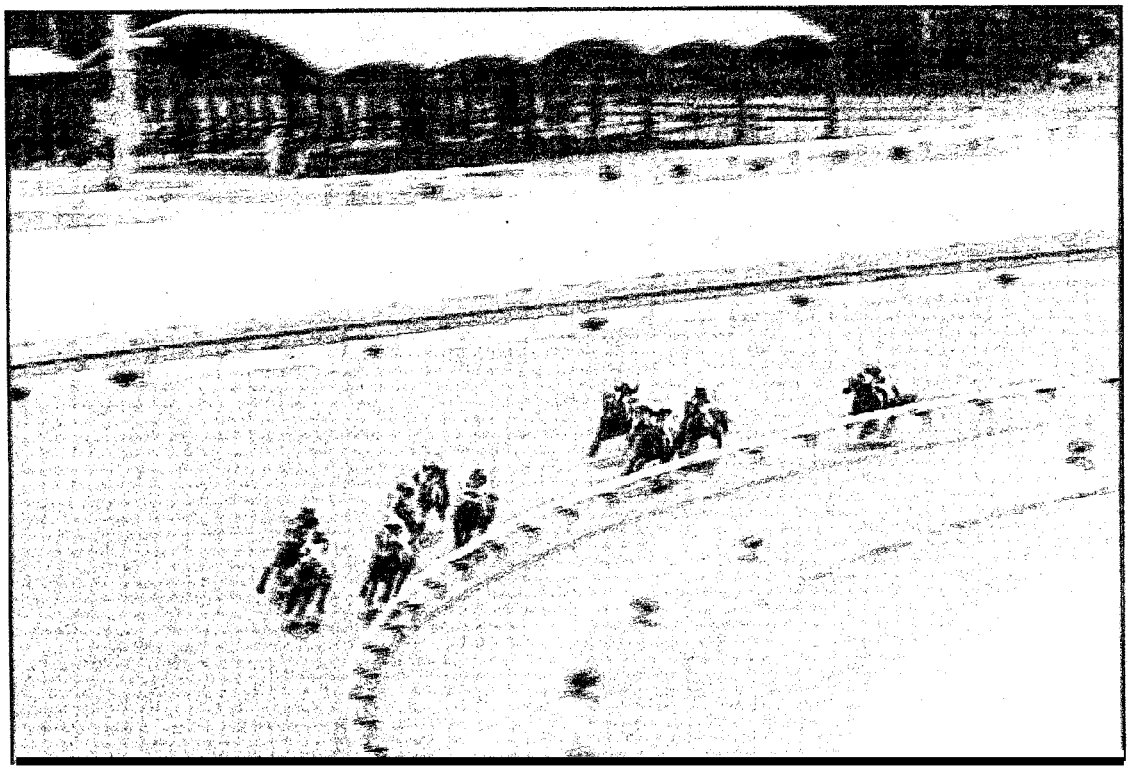
FIG. 13 shows an example of a patrol image near a corner.
Figure 14:
FIG. 14 shows an example of a patrol image near the goal.

Examples of the above-mentioned patrol images are shown in FIGS. 11-14. FIG. 11 is the image immediately after start, FIG. 12 is the image at the 2nd corner, FIG. 13 is the image at the 4th corner and FIG. 14 is the image near the goal, respectively, all of which are captured by 1st corner camera 34. In the case of the race of 1600 m lawn track race aforementioned, the number of captured image frames becomes around 2800-3400.

In synchronization with said corner 1 camera 34, images of the same scene is captured by each corner camera 33, 35 and 36, as already explained. Therefore, images near the goal as shown in FIG. 14 are captured by 2nd corner camera 35 and 3rd corner camera 36 from oblique-horizontal directions.

(I) Image Processing

These images are analyzed according to the flow chart of FIGS. 4-9.

(1) Starting Process with the Start Frame

Figure 4:
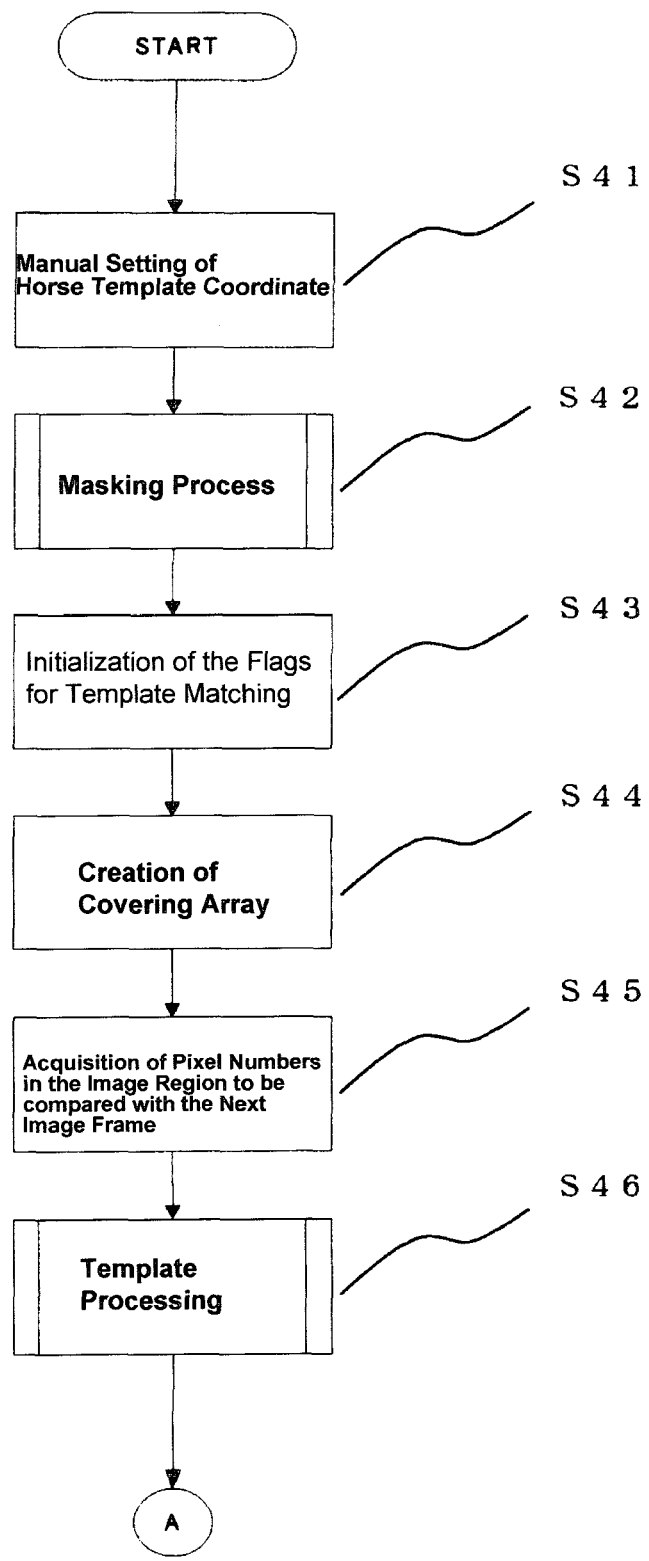
FIG. 4 is the process flow chart for a starting frame.

First, in FIG. 4, positions the template of each image (S41), performs masking process (S42) and initializes flags for template matching (S43). Although this initialization for image analyses is manually performed considering the influence of the gate image, it can be automated by applying the template-matching process to be explained later to the initial picture.

Figure 10:
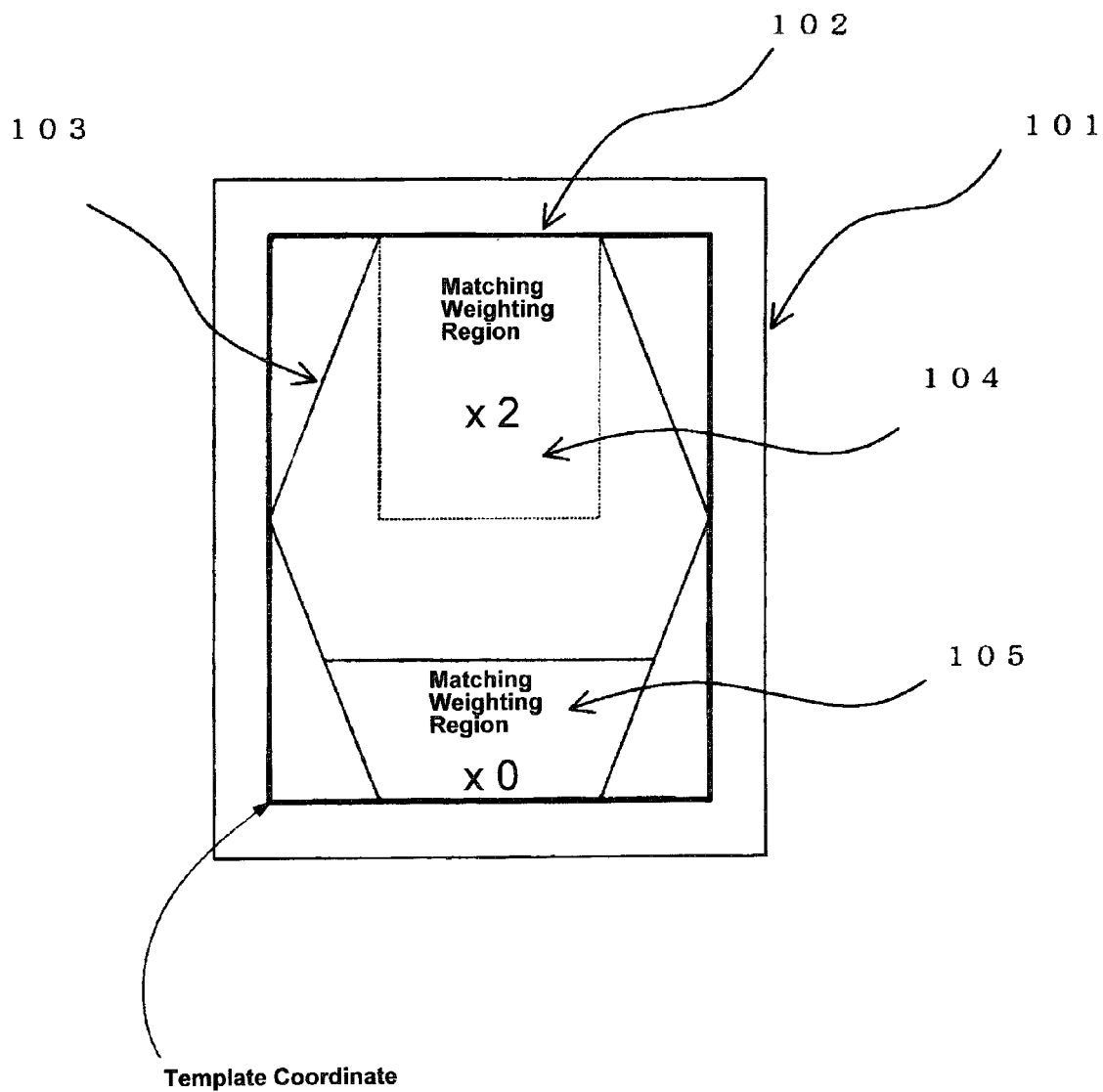
FIG. 10 shows the shape of the template used for the present invention.

The template of the present invention is shown in FIG. 10. In FIG. 10, 101 (the region enclosed by the thin line) is the search area in the following frame. The direction of horse movement is limited to the forward direction, and it does not shift much to a horizontal direction even near the corner. Therefore, a limited narrow area of said search area 101 centering the position of the adjacent horse is enough as the search area for the horse in the next frame. Processing time can be shortened by this. In FIG. 10, (the region enclosed by the thick line) shows a rectangular template region. Similarity analysis for horses can be performed for this rectangular area.

However, in the present invention, in order to attain higher accuracy, a hexagonal template, 103, shown in FIG. 10 is used.

The procedures are described as shown hereunder.

a. Set the template coordinates of each horse manually. (S41)

b. Masking process by color (S22)

Extract the objective horse and jockey in the image by color.

Here, "masking process" means extracting image portions of analysis objects and blacking out other portions, as shown in FIGS. 15-18, for example. In this example, the horse and jockey portion and the fence portion are identified and extracted by color.

As image portion extraction in this case, said image portions are clipped by extracting edges of color information of said horse and jockey portion and the fence portion and masking process is performed as shown in FIGS. 15-18. Edge processing of a digital image is common art in the field of image processing as shown in JP,8-123967,A or JP,7-93561, A, for example, and the technique basically calculates the peak of differential values.

As will be explained later, the size of the template is adjusted to the size which the clipped image matches best.

c. Determination of horse number

In the frame immediately after start, relationship between the image of each horse and the horse number is manually inputted. By doing so, the trail of each horse which will be obtained finally and the horse number can be recorded.

d. Initialization of flags (S43)

Flags for image analysis showing the following items are initialized.

Flag z to show whether the portion of non-zero values is larger or not in the template region.

Flag c to show whether the portion in the template region is largely covered with the hexagonal region of another horse or not.

A flag to show whether the template region runs out of the image or not.

A flag to show which size of the reference range is used.

Reasons for setting these flags are shown below. Racehorses in a race tend to make a group, so that, when an image is captured from a patrol tower, horses in the captured image overlap each other in many cases like center portion of FIG. 15 and upper right portion of FIG. 16. In such a situation and when the template image is to be compared with the template image of the following picture, since the portion overlapped by another horse is the unnecessary portion for similarity analysis, analysis must be performed after deleting said unnecessary portion. The flag whether the portion of non-zero values is larger or not in the template region is set, since this is basic information for deciding whether the image information obtained presently is enough for similarity analysis or not. Also, the flag whether the portion in the template region is largely covered with the hexagonal region of another horse or not is necessary to decide is required to decide whether it is the minimum required data for similarity analysis or not (according to experimental results, the analysis is possible if this portion is about 30%).

The size of the template is variable and the template is always used to match the size of the image, but if the matching is not suitably done, the template area may run out of the horse image and finally miss it, so that it is required to monitor such situation and set the flag in preparation for the following processes. Whether the maximum value of cosine theta is below a threshold value or not when using similarity analysis is required for judging the identity of template images, since the images are judged identical when the similarity value becomes below a predetermined level.

As explained above, these flags offer information for deciding whether the data processing is effective or not.

e. Creation of covering array (S44)

As mentioned above, since the portion covered by other horses is unnecessary for similarity analysis, and it is necessary to delete the said portion before analysis, so that it is necessary to create a covering array.

f. Create a template region (hexagonal region) assigned to a horse.

As mentioned above, a template is applied to the clipped image. Here, the template is stuck to the image as having a matched size with the clipped image. Adjustment of the size is performed so that for the template in FIG. 10, by change three parameters of the upper side length of the hexagon, height and width of the square, the template with which the number of color image data for the horse becomes the maximum is chosen.

g. Acquisition of pixel numbers in the image region to be compared with the next image frame (S45)

Within the template region of each horse, pixel numbers in the hexagon region that is not covered are acquired, and zero is inputted for all of other regions. This is because, for identity comparison between the present image and the next frame image, it is necessary to compare the images in the same regions.

h. Template processing (S46)

(to be explained later)

(2) The Main Loop after the 2nd Frame

Figure 5:
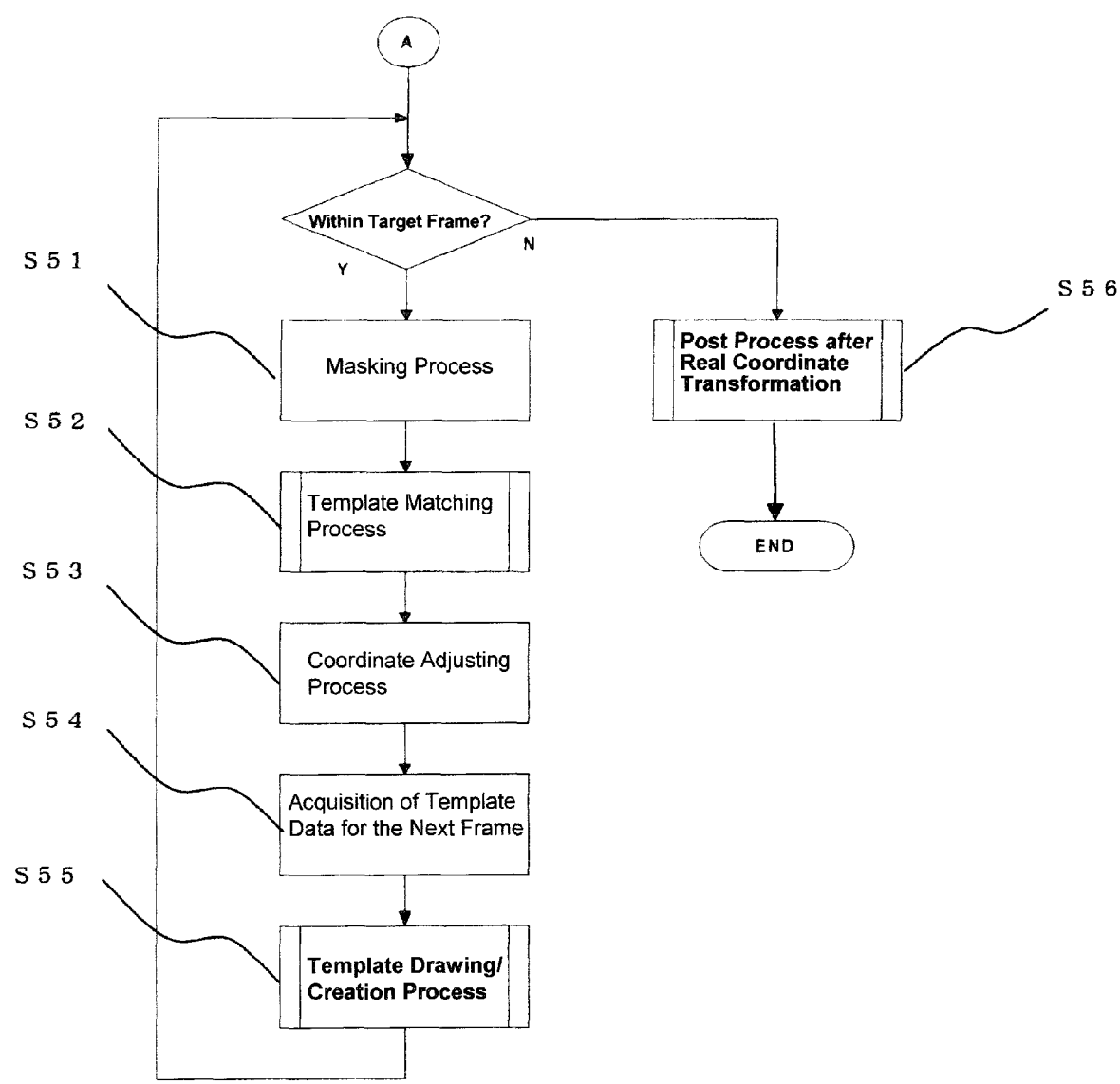
FIG. 5 is the continuation of the process flow chart for the starting frame.

As shown in FIG. 5, following steps are performed within the frame as the processing target, similarly to the above explanation.

a. Masking process by color: extraction by color of the horse and the jockey (S51)

b. Template matching process (S52)

c. Pixel numbers for the new region are acquired for matching with the template region of the following image frame, since the size of the template region may change (S54)

d. Hexagonal region drawing/creation process (S55)

Figure 19:
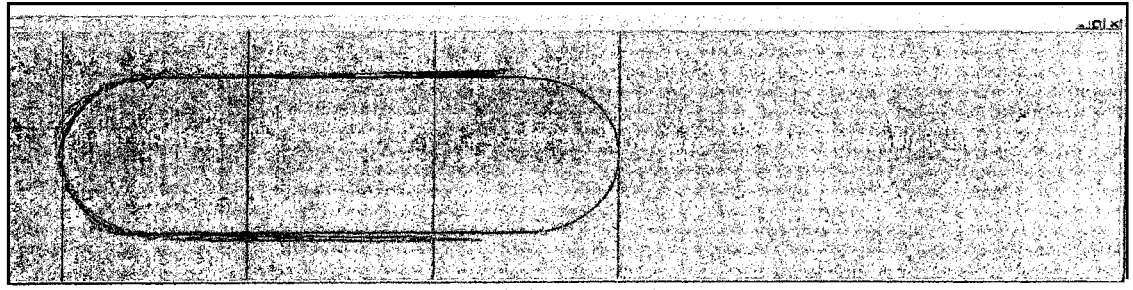
FIG. 19 shows a display example of the race progress.
Figure 20:
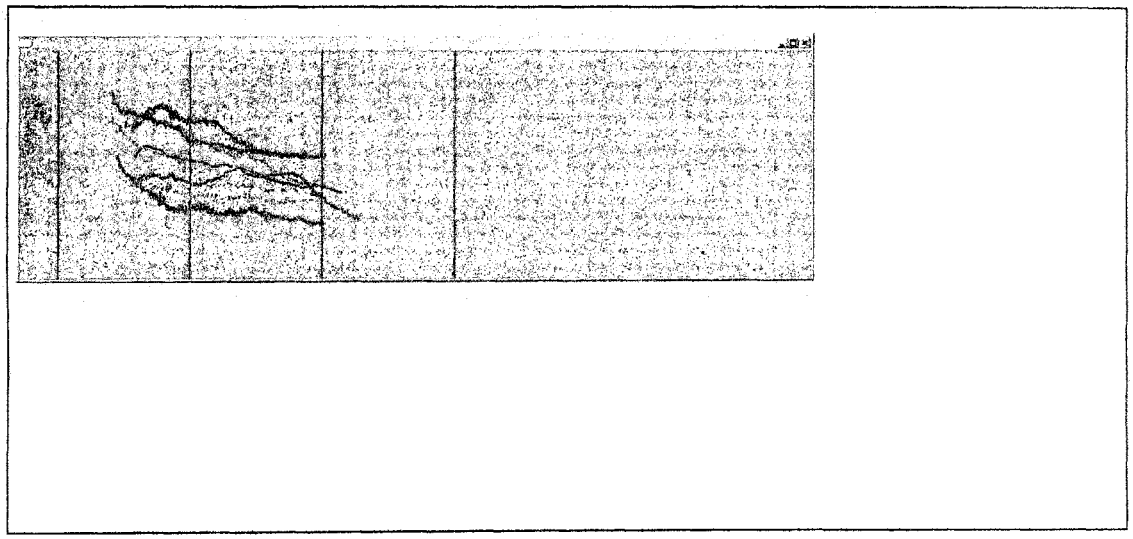
FIG. 20 shows a display example of the race progress when the course is assumed to be a straight line.

When finishing above processes for the processing target frames, e. Post process after real coordinate transformation (generation of the whole trail on absolute coordinates) (S56) is carried out to display coordinate of each horse obtained by above-explained analysis on the plain figure of the racecourse as shown in FIG. 19, or to display the progress of the race assuming that the course is a straight line as shown in FIG. 20.

f. Finishing process

Figure 6:
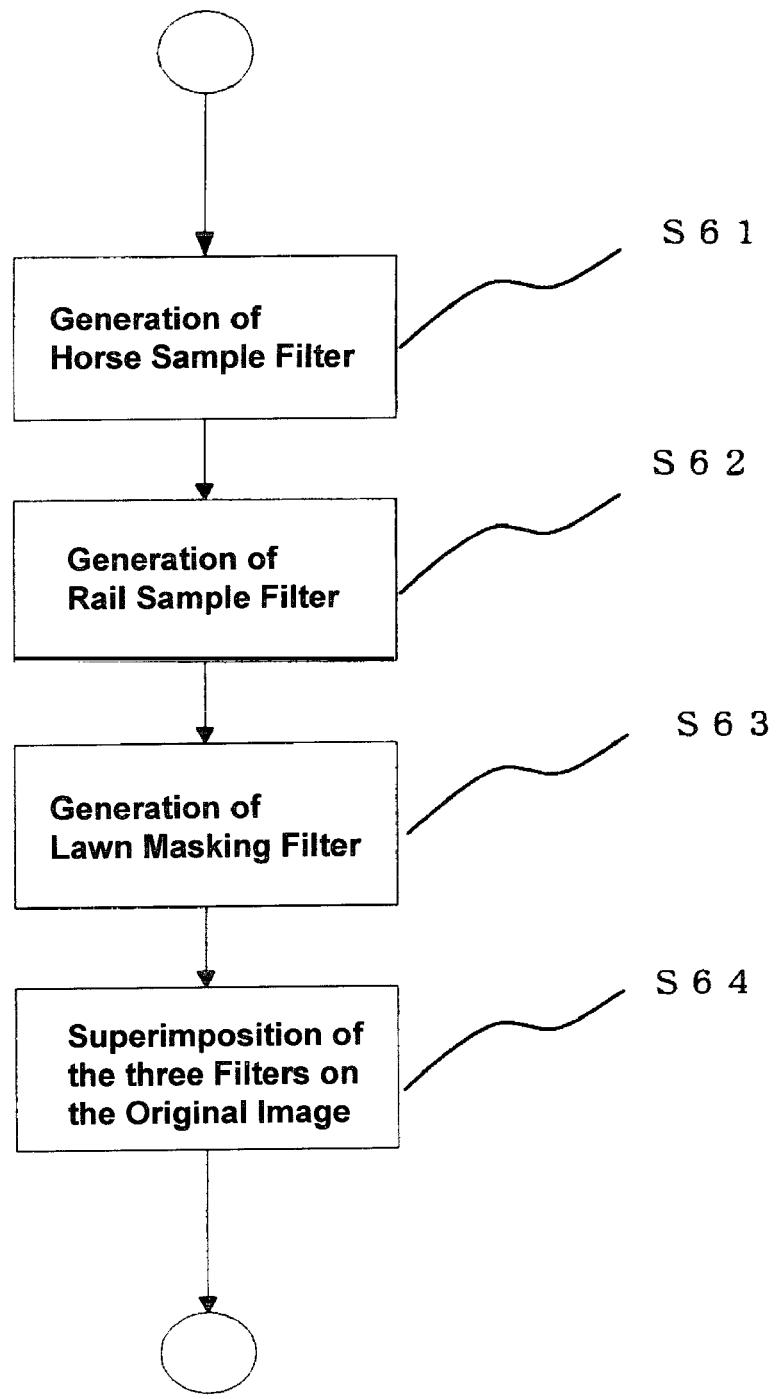
FIG. 6 is the flow chart of the mask-processing algorithm.

The masking process algorithm of FIG. 6 is explained hereunder.

As explained earlier, objects are extracted by color within the image, a sample filter for the horse is generated (S61), a sample filter for the rail (fence) is generated (S62), and a mask filter for the lawn track is also generated (S63), and these are superposed (S64). By this "masking process", the image portion of the analysis object is extracted, and image information as shown in FIGS. 15-18 is obtained.

(3) Template Matching Process

Figure 7:
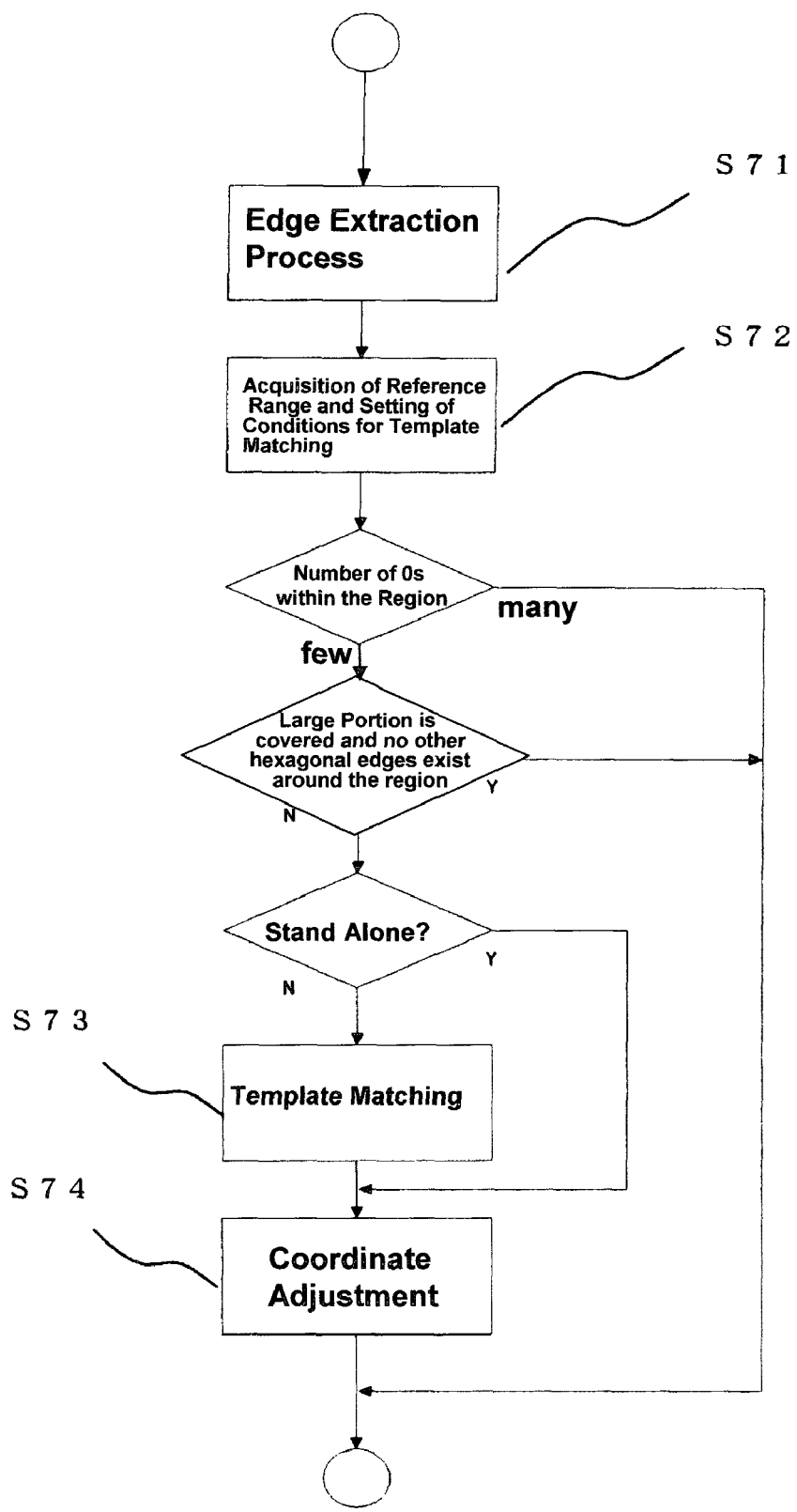
FIG. 7 is the flow chart of the template-matching process.

Template matching process is performed as shown below and in FIG. 7.

a. Edge extraction process (S71)

b. Acquisition of the reference range and setting of conditions for template matching (S72)

For the template region of each horse, cnt: Pixel numbers in the hexagonal region, cnt_c: pixel numbers in the hexagonal region not covered by other hexagonal regions, and cnt_z: pixel numbers in the region where masking process is not applied in comparison with the present image within the cnt_c are calculated, and the flags are determined based on these data.

Flags are determined according to the following rules.

When the ratio of the portion where the masking process is not applied among the hexagonal region (cnt/cnt_z) does not satisfy a prescribed threshold value, flag z is set as false considering that numbers of non-zero values are not enough, and flag z is set as true when the ratio satisfies the threshold value.

When the ratio of the portion not covered by other hexagonal regions (cnt_c/cnt) does not satisfy a prescribed threshold value, flag c is set as false considering that the region is largely covered by other hexagonal regions, and otherwise, set as true.

When cnt_c=cnt, flag c is set as exception since the hexagonal region is completely free from others.

c. Which hexagonal region covers the upper or the lower area of the object hexagonal region is checked.

d. Template matching (S73)

Template matching is searching whether a horse image which has the same similarity characteristics as the present horse image exists within the search area in the following picture frame or not.

1. Whether other hexagonal regions exist in the horse search area or not is checked.
2. After checking, when the one exists in the search area, apply template matching. Here, which type of template matching is applied is determined using flags.

When small portion of the hexagonal region is covered (flag c=true or exception) template matching using initial values for the reference range is applied.

When large portion of the hexagonal region is covered by others (flag c=false)
   if there is another hexagonal region just above, template matching is applied for search area with initial values.
   whether there is an edge which does not belong to any hexagonal region or not is searched within the search area, and if there is any, template matching is applied for a changed search area.

Template matching is not applied if neither of two conditions above is satisfied.

3. When other hexagonal regions other than one do not exist, if non-zero values are very few (if flag z is false), the process goes to coordinate adjustment (S74).

After these pre-processes, 4. the range of template movement is determined.
5. Similarity analysis is used within the movement range, and the coordinates with the best results are set as the template coordinates.

e. Update of the template size

Using the template region and the area where masking process is not applied, which horse is sampled as one horse is detected. And the average of the areas for the sampled horse is used as the updated size of the template for the present image frame.

f. Coordinate adjustment (S74)

The template coordinate is finely adjusted so that the updated template is the optimal solution. Specifically, whether other horses exist in vertical or horizontal directions or not is searched, and when there are no other horses: the template coordinate is adjusted in reference to the sampled range, and when there are any other horses: the template coordinate is adjusted based on the template coordinate of the preceding image frame and on the present template size.

(4) Template Drawing/Generation Process

Figure 8:
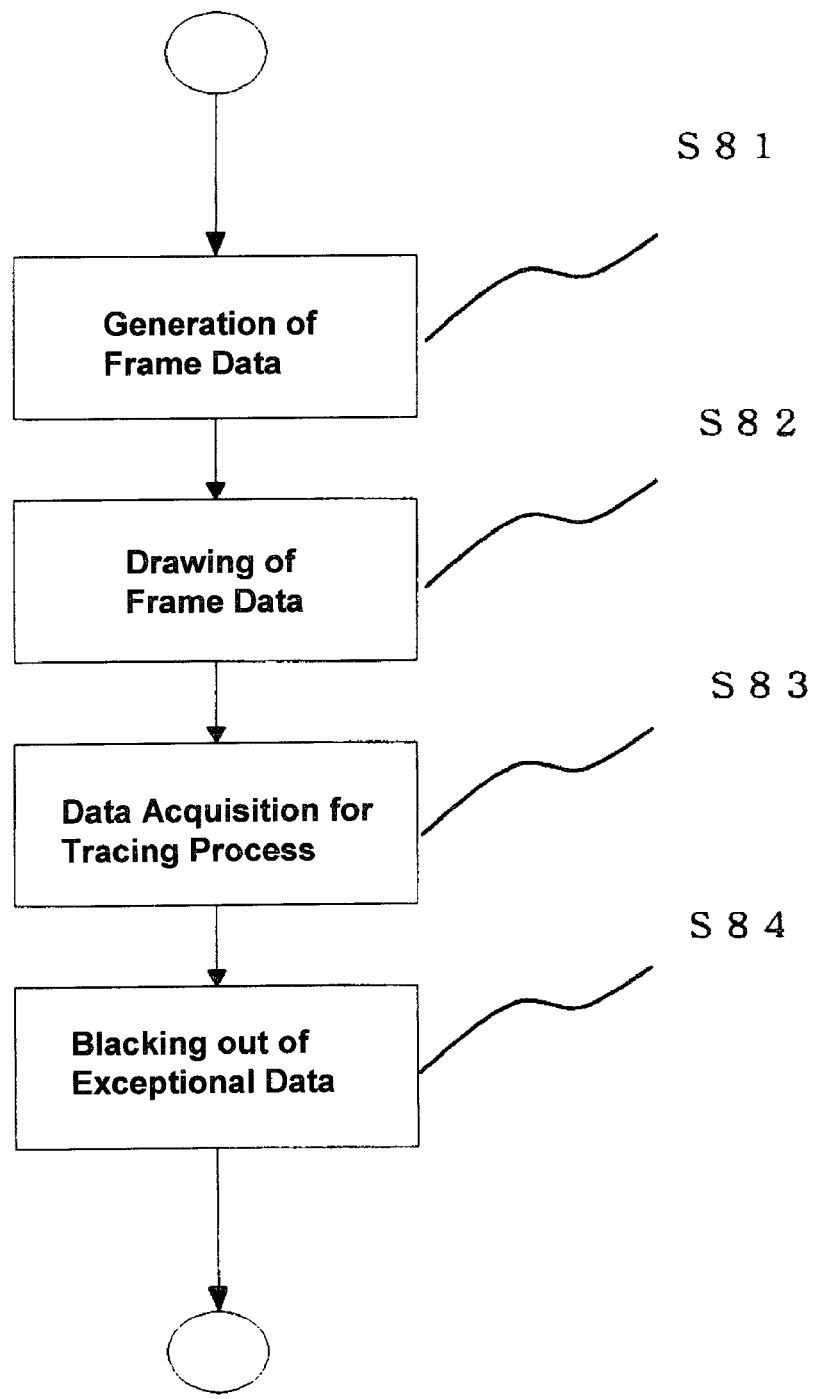
FIG. 8 is the flow chart of the template drawing/creation process.

FIG. 8 shows the flow chart of template drawing/generation process.

a. Generation of frame data (S81)
b. Drawing of the frame data (S82)
c. Data for computing the absolute coordinate is acquired. (S83)
d. Blacking out of exceptional template (S84)

Unnecessary templates are distinguished by color as shown below and wiped out from the picture for blacking out.

Red: the target horse is out of the image.
Blue: no processing applied because conditions are not met.
Yellow: the portion of non-zero values for the horse is smaller than the threshold.
Green: the coordinate of the horse is used as the barycentric coordinate.

Here, the term "similarity" used in this invention is explained. The principle of "recognition using similarity" is indicated in detail in "Processing and Recognition of Visual Patterns" (Noboru Funakubo, Keigaku Shuppan, first edition in 1990).

Figure 21:
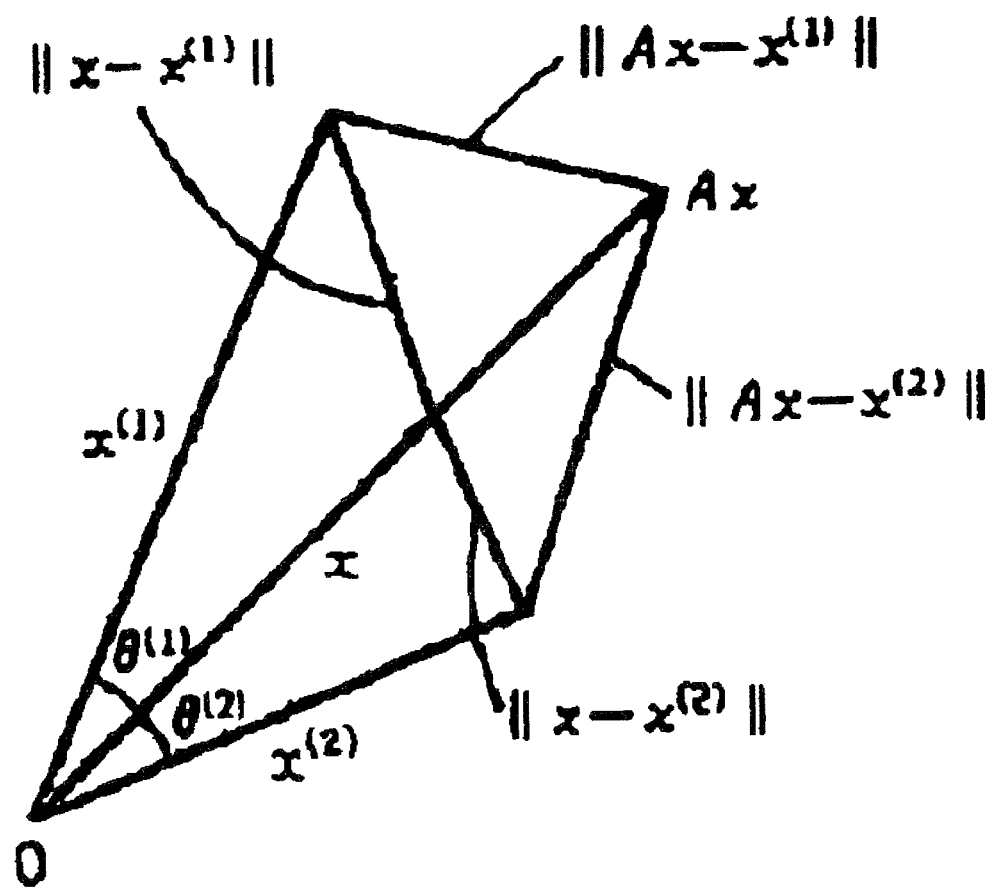
[FIG. 21] When comparing an input pattern with a reference pattern (template picture which becomes the origin of a comparison), it is an explanatory diagram of the technique of measuring the angle which two vectors make.

Similarity analysis is a technique of comparing angles which the two vectors make as shown in FIG. 21, when comparing an inputted pattern with the reference pattern (the template picture as the basis of comparison). A method of simply calculating the difference between the two sheets of patterns is largely influenced by the change of values of pixels which compose the patterns, whereas calculating the angles of the two patterns can reduce the influence of the change in pixel values. In FIG. 21, x and Ax show input patterns, x(1) and x(2) show the reference patterns, and A show a constant.

Cosine (equation (1)) between the two patterns is calculated by the equation below.

$$S_s^{(1)}(x) = \cos \theta^{(1)} = (x, x^{(1)})/\|x\|\|x^{(1)}\|$$ Eq. 1

As shown in FIG. 10, the hexagonal template that was registered for the preceding image frame is placed on the same position of the present image frame, the equation is calculated within the adjacent region of 101 by shifting 1 pixel at a time, and the point where the calculated angle matches best (the point where cos theta becomes the maximum) is the target horse position in the present image frame.

In this way, when a target object which was in one image frame moves to the following frame, by calculating whether similarity of the template in the preceding frame is the highest for the template in the following frame or not, whether two patterns existing in the two frames are the same object or not can be decided. Thus, the position of the same object in each image frame can be determined.

The technique of calculating similarity by using color images is explained hereunder.

Recognition by Similarity

A color image comprising RGB pixels is first converted by using HSV conversion to three images of hue, chroma and lightness.

Among the three image patterns, the hue image and the lightness image are used here. Each color image is converted to the hue image and the lightness image, said similarity is calculated for each image, and the sum of the both similarity values is used for recognition.

(II) Analysis of the Position Coordinates

From the picture analysis explained above, the absolute position of a horse is obtained as shown in the following.

Since the purpose of the horse position information analyzing and displaying method of the present invention is to display the trail of each horse in a race, that is, to display the progress of the race, exact positions at different times for each horse are not necessarily required. Since a precise image judgment system or a photo finish system is equipped near the goal conventionally, judgment of arrival order at the goal and measurement of time are performed precisely as usual.

Rather, in the present invention, information of the absolute position is obtained from the image analysis. How to obtain the absolute position is shown below;

1: An absolute coordinate is assigned to an object which does not move or to an object of which movement can be easily predicted in the image. For example, the average of the template coordinate of a horse does not deviate largely for a certain timeframe such as in the homestretch. So that, by only setting the absolute coordinates of the start position and the end position manually, the absolute coordinates in image frames in-between can be predicted.

2: Each difference between the template coordinate of each horse and the point that is used as the reference of the absolute coordinate and that is obtained by the step 1.

3: How much difference in distance, when converted to the absolute coordinate in both vertical and horizontal axis directions of the image, is growing is calculated, considering the position, angle and zooming of the camera and moving direction of the horse, and so on.

4: The absolute coordinate of the horse is calculated by adding the difference obtained by step 3 to the reference coordinate obtained by step 1.

Also, since furlong rods stand on the fence of the racecourse every 200m, for example, and the image frame number when the leading horse passes said furlong rod is obtained by the patrol image captured from the lateral direction, and since a horse runs approximately at a constant speed between two furlong rods, passing distance per each image frame can be calculated approximately from the image frame numbers elapsed for a horse to pass between a furlong rod and the following furlong rod. Not only furlong rods but also other ground indicators can be used for references mentioned above, and a more exact absolute coordinate can be automatically detected by using a discrimination display such as changing color for each portion of the fence, for example.

In an image captured from the front as shown in FIG. 14, the ranks of horses are determined in the order of a smaller Y coordinate value along the Y axis (vertical direction) of the image. In FIG. 14, for example, the image is captured from the front of horses, so that the rank can be determined as the horse at the smallest vertical axis (Y axis) value is the front runner.

Figure 18:
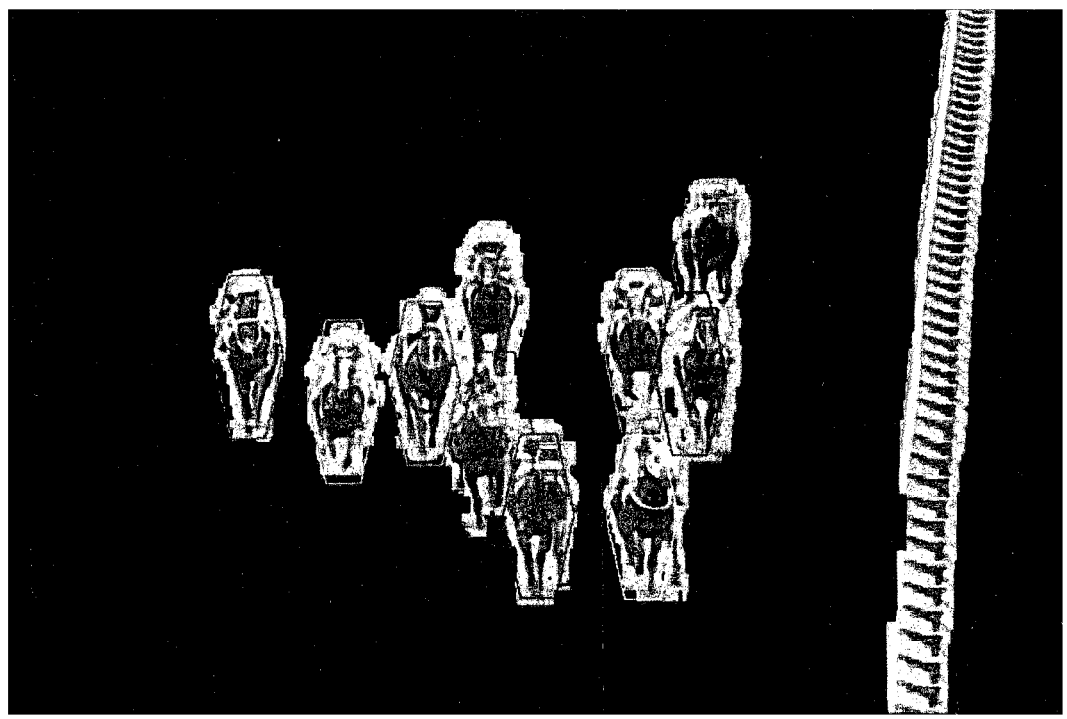
FIG. 18 shows an example of a clipping picture of the patrol image near the goal corresponding to FIG. 14.

The moving distance of the front runner between two image frames as shown in FIG. 18, for example, can be calculated by prorating the movement in vertical (Y axis) direction on the image. Since passing distance per one image frame is known as explained earlier, the approximate position coordinate of the fore-horse can be calculated. Thus, once the position coordinate of the fore-horse is determined, the distance between the following horse and the fore-horse can be calculated as the deviation of its position coordinate along the Y axis from the position of the fore-horse. In this way, the absolute position of each horse is computed from the patrol images.

Figure 9:
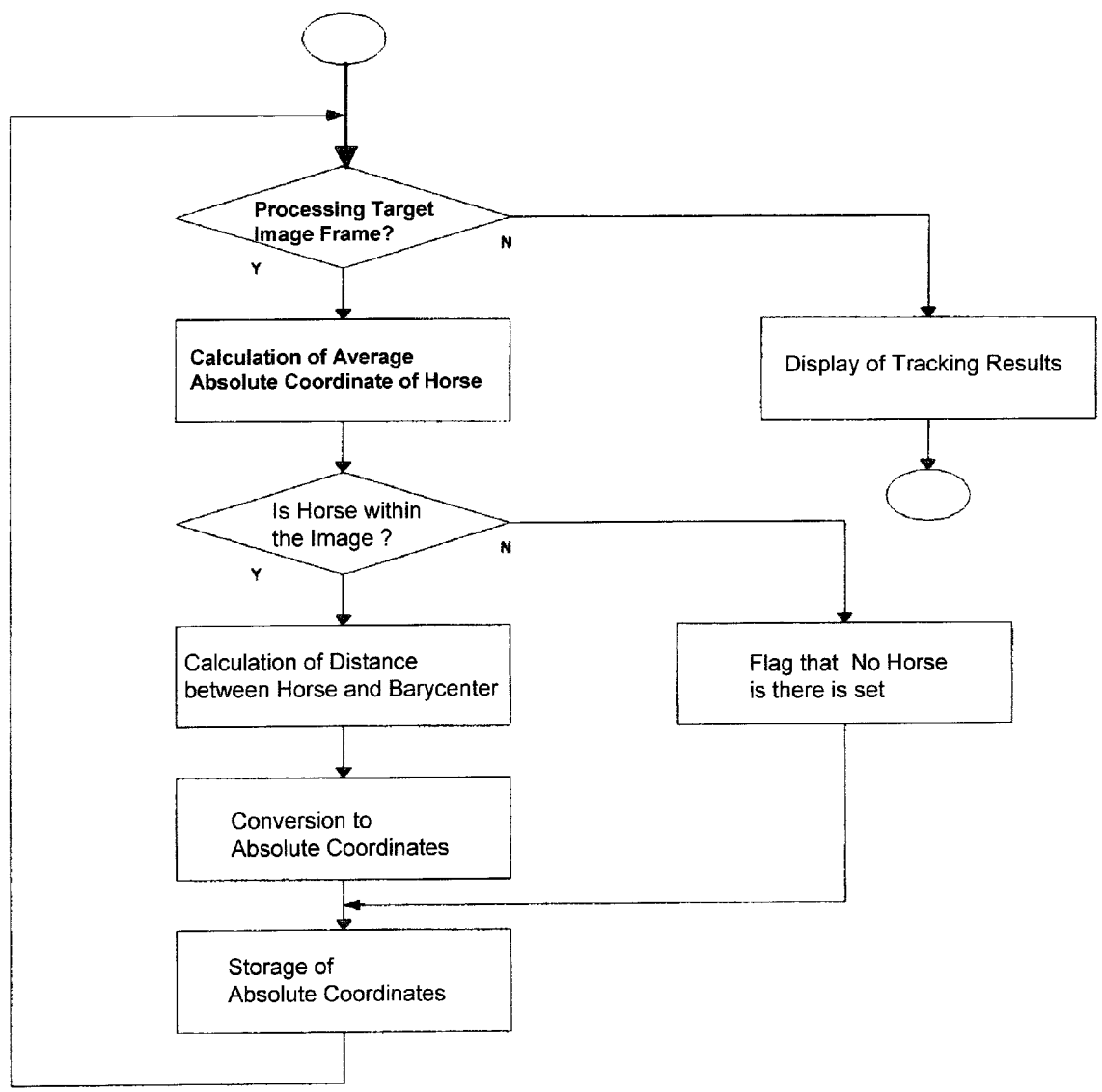
FIG. 9 is the flow chart of the post process after coordinate transformation.

FIG. 9 shows a detailed flow chart of the post process after real coordinate transformation. The obtained trail information of each horse is displayed on the plain figure of the racecourse as shown in FIG. 19. Or, instead, the progress of the race can be displayed assuming that the race course from the start to the goal is a straight line as shown in FIG. 20. Although FIG. 19 and FIG. 20 show the total trails, displaying each image frame continuously from the start to the goal as moving pictures is desirable, since the progress of the race can be seen clearly. In this case, if horse pictures are reproduced using CG, the progress of the race will become more realistic.

The amount of data of the position information in each picture frame is extraordinarily small as compared to the amount of data of the racing image itself, and only said position information data is delivered and the racing image is reproduced at the receiving side. For this reason, a transmission medium with little transmission capacity (a cellular phone system, for example,) can reproduce the race picture clearly, realizing high convenience.

Another embodiment example is shown where the accuracy in the image analysis of horse position information is increased.

Figure 15:
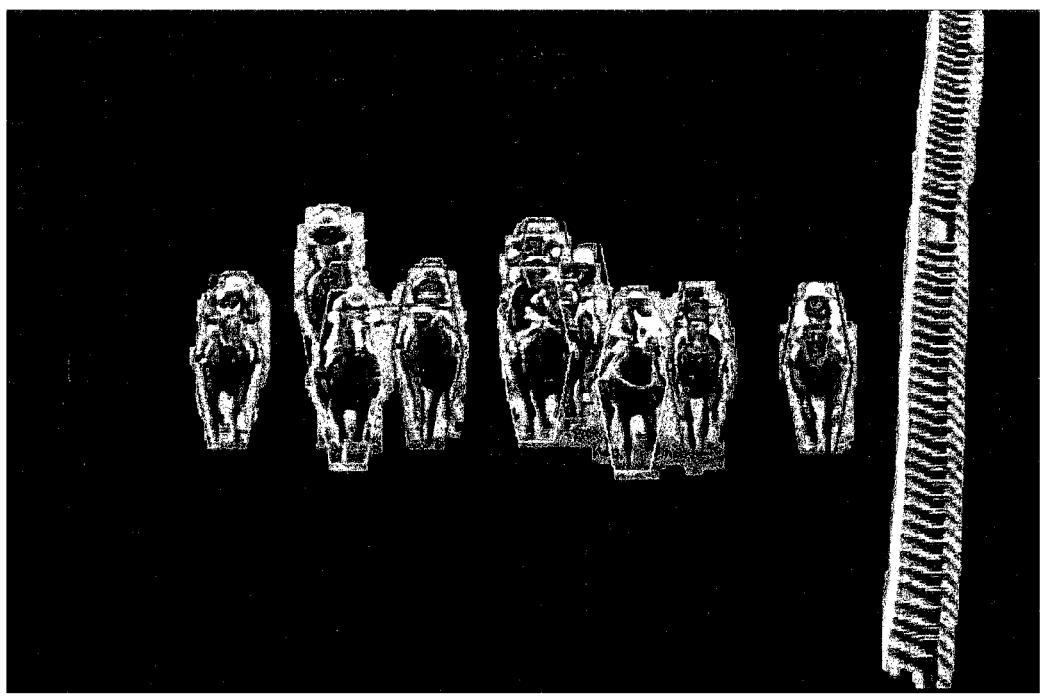
FIG. 15 shows an example of a clipping picture of the patrol image immediately after start corresponding to FIG. 11.
Figure 16:
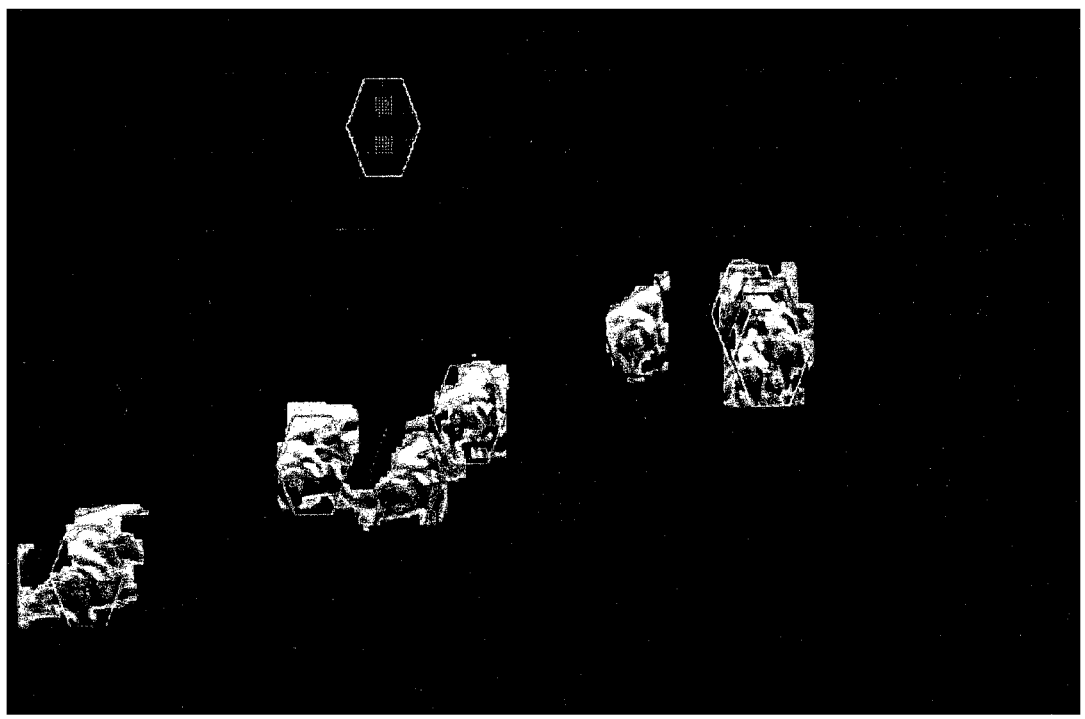
FIG. 16 shows an example of a clipping picture of the patrol image near the 2nd corner corresponding to FIG. 12.
Figure 17:
FIG. 17 shows an example of a clipping picture of the patrol image near the 4th corner corresponding to FIG. 13.

In the proposed image analysis shown in FIG. 15 and FIG. 17, for example, if the objective horse and jockey in the image are extracted by color using the masking process by color, the portion of the fence (which is called "Rachi" as a jargon) will be extracted from FIG. 15, and the image of the starting gate which is shown behind in FIG. 11 will be extracted from FIG. 17.

If these images having no relationship with horse images are extracted, they become noises and causes of an error in clipping a horse image using a template, resulting in accuracy degradation of horse image extraction.

As already explained, "Mask processing" means extracting the image portion of an analysis object and blacking out other portions, for example, as shown in FIGS. 15-18. In FIGS. 15-18, horse and jockey portions and the fence portion are recognized by color and extracted. In examples of FIG. 15 and FIG. 17, since the color components of Rachi or the gate portions are similar to those of horses, Rachi or the gate will be extracted together with horse images so that the process of applying templates and image analysis must be carried out, resulting in useless calculation.

Figure 22:
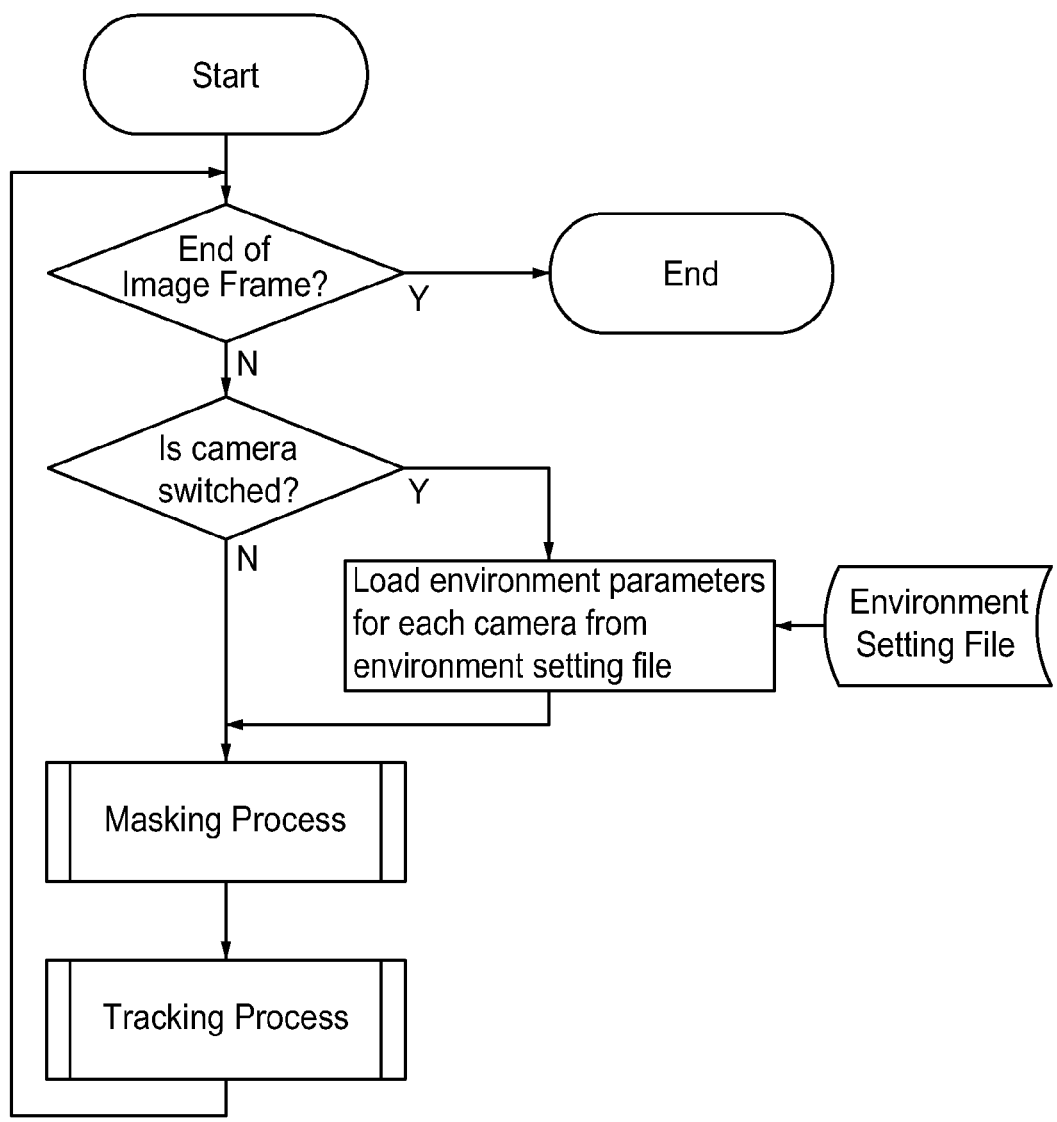
FIG. 22 shows a flow chart of the improved total image processing of the present invention.

The present invention improves the above-mentioned defect in the horse image clipping process, by deleting the noise portion other than the horse images in advance. The whole flow of selecting an image frame from continuous image frames and analyzing the horse position information is shown in FIG. 22. Since patrol cameras are installed at 4 to 6 points around the course as shown in FIG. 3, it is necessary to input the system of which camera the image is analyzed. As for environment information, the track type of lawn or dirt, whether the weather of the day is fine or cloudy, environmental information of each camera affecting on image capturing conditions, and which camera's image is used according to the running position of the racehorse, for example, are inputted in advance.

Figure 23:
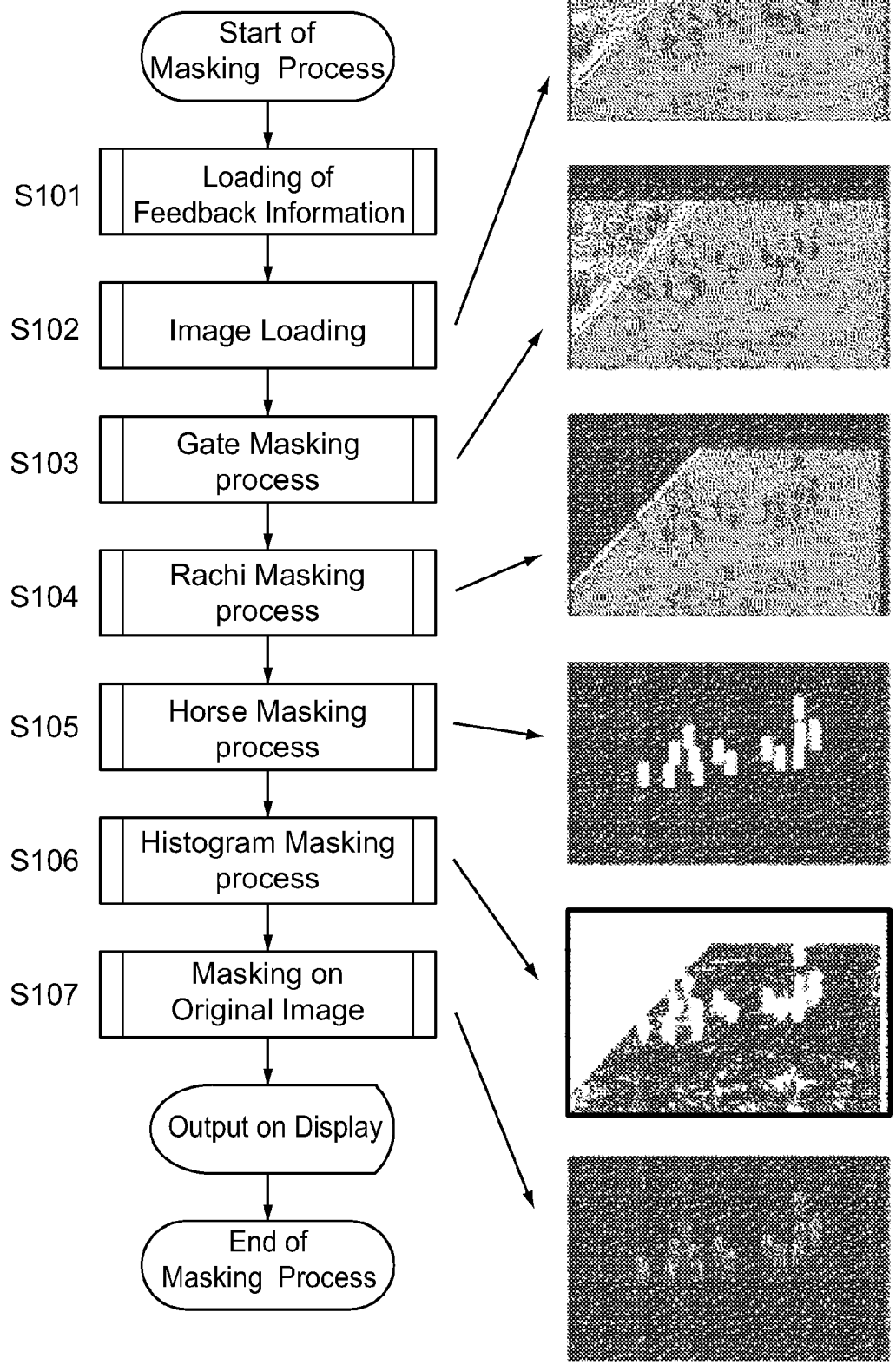
FIG. 23 shows a flow chart of the improved total image extraction algorithm of the present invention in case of a lawn track.
Figure 24:
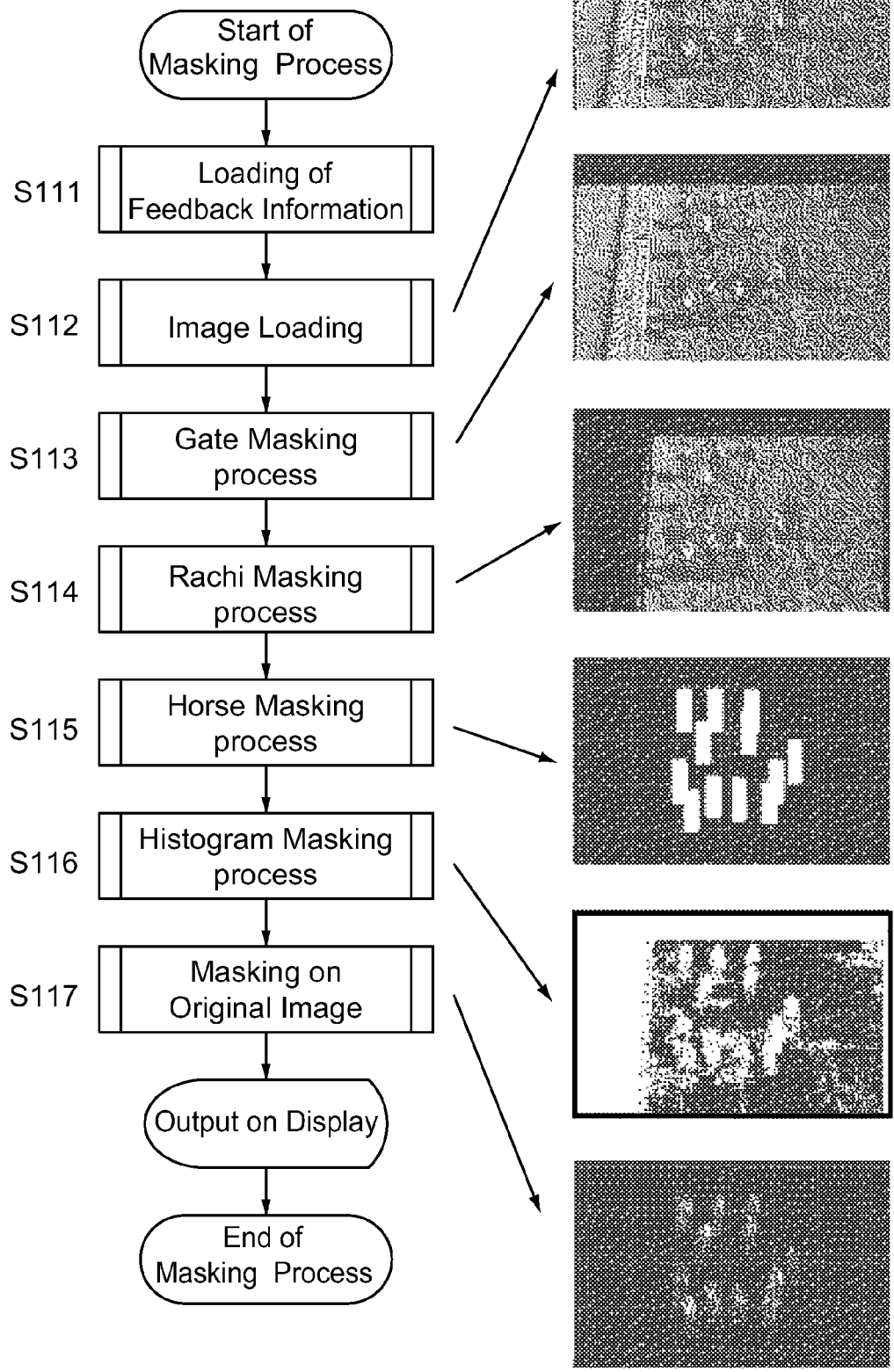
FIG. 24 shows a flow chart of the improved total image extraction algorithm of the present invention in case of a dirt track.
Figure 25:
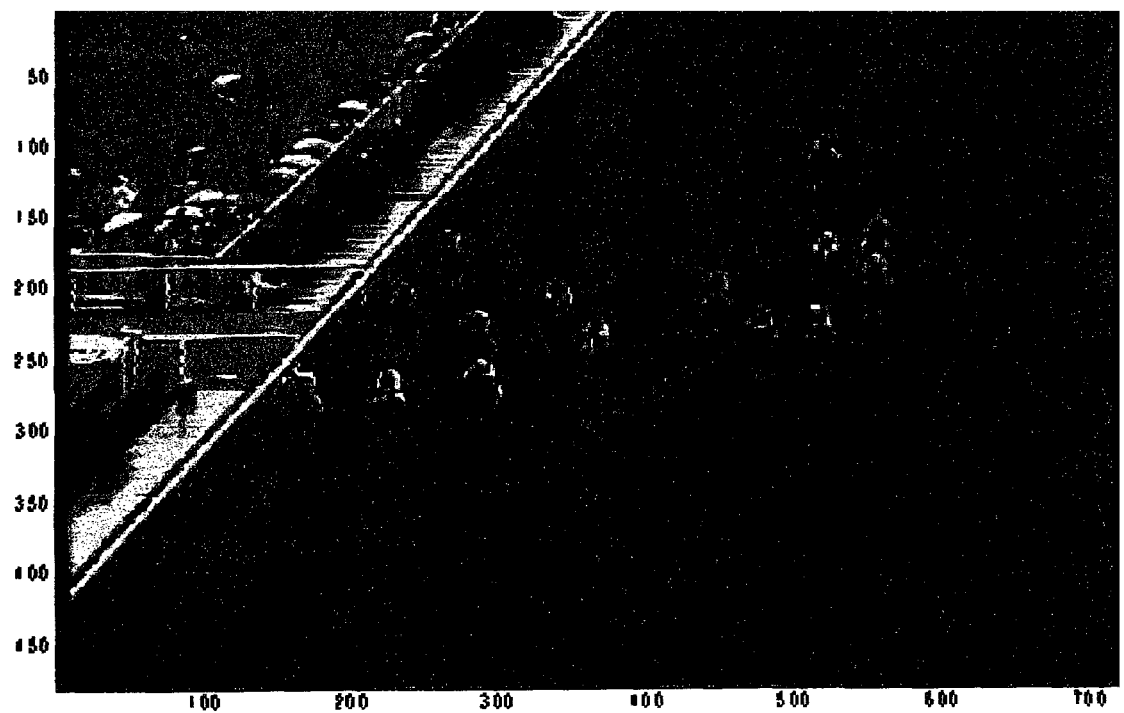
[FIG. 25] is an enlarged view of the image in FIG. 23.
Figure 26:
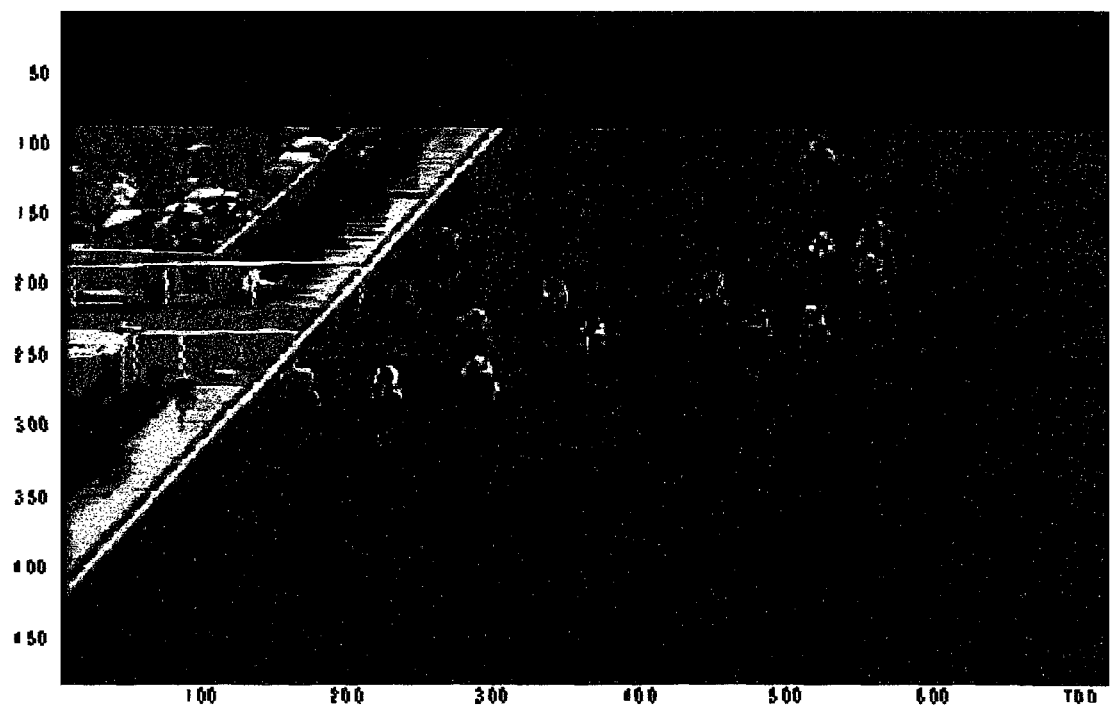
[FIG. 26] is an enlarged view of the image in FIG. 23.
Figure 27:
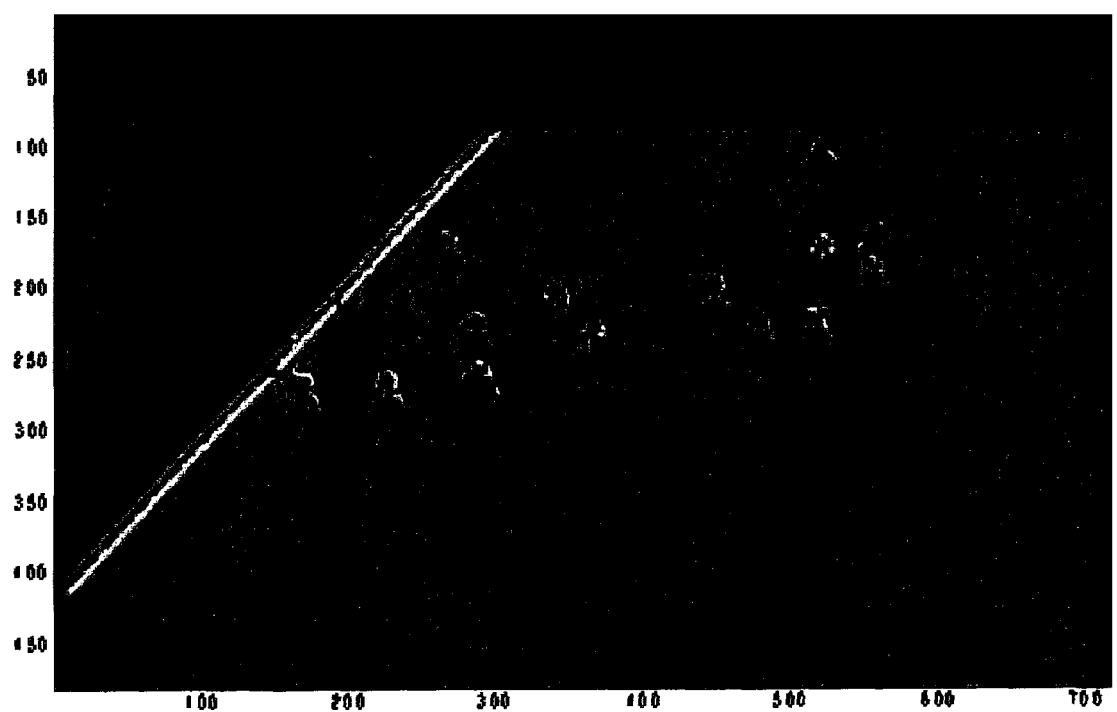
[FIG. 27] is an enlarged view of the image in FIG. 23.
Figure 28:
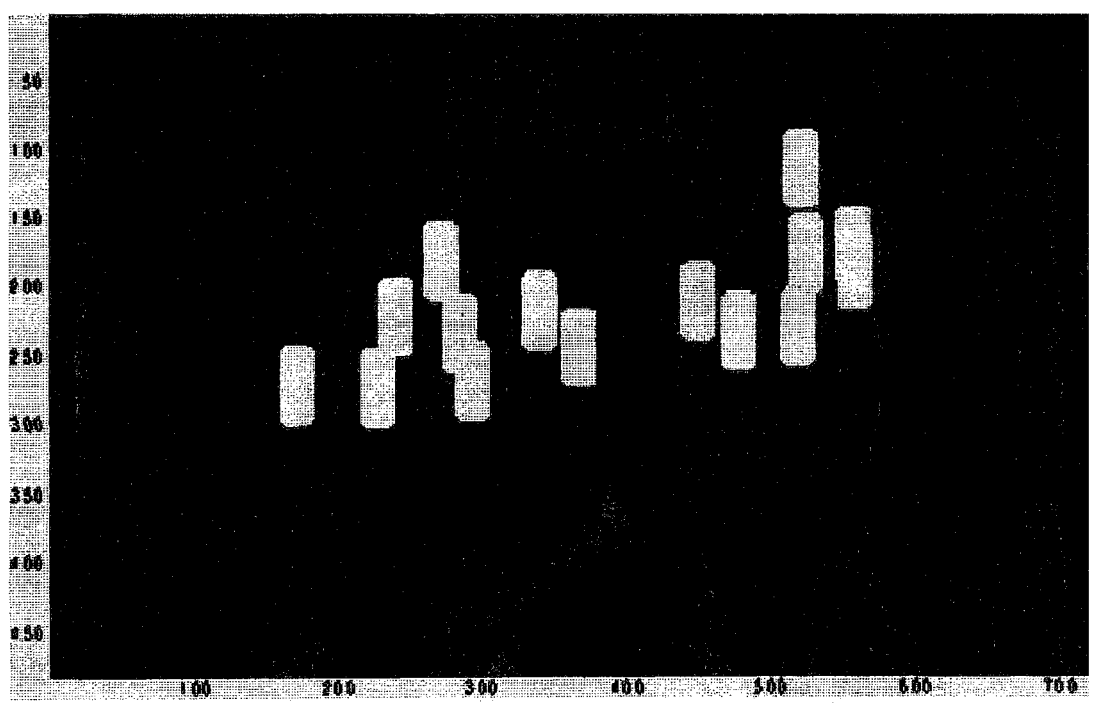
[FIG. 28] is an enlarged view of the image in FIG. 23.

An algorithm by which the accuracy is increased in the image analysis of the invention aforementioned is shown in FIG. 23 and FIG. 24. FIG. 23 shows the example for analysis in the case of a lawn track, and FIG. 24 shows the example for analysis in the case of a dirt track. This algorithm is a procedure of masking (blacking out) other portions than the horse portions in order to improve tracking accuracy. FIGS. 25-30 are expanded views for each image in FIG. 23. FIGS. 31-36 are expanded views for each image in FIG. 24.

The outline of the procedure of FIG. 23 is explained below.

Feedback information is loaded by S101.

Feedback information loading process is to load the tracking result for the preceding image frame (just one frame before the present) so that it is reflected on the image frame for which process is presently under way. Since the time difference between each two consecutive image is only 1/30 seconds based on the general moving picture specification, diverting the process result for the preceding frame to the present frame can reduce processing time and increase processing accuracy.

The whole image is loaded by S102.

At the image loading process, an image to be processed is loaded to the processing system, and at the same time, HSV conversion which transforms pixel value format from RGB to HSV is performed, then, the size of the image is measured. The HSV conversion is explained below.

The loaded image is expressed in the RGB format. The RGB format expresses an image by numerical values of colors of red, blue and green which are three primary colors of light. Whereas, the HSV format expresses an image by hue, chroma and lightness. Processing procedure becomes clear by transforming the format from RGB to HSV, since which parameters should be changed becomes simplified and visible.

At S103, the image portion behind the horse at the tail end is eliminated from the whole image.

"Gate masking process" is a process of eliminating the image portion behind the horse at the tail end. By performing this process, influence by unnecessary portions other than the race track, such as the starting gate immediately after the start in the image frame shown in FIG., for example, can be removed. Since this process is effective also for image frames including unnecessary background images such as shown in FIG. 13, the process is applied automatically to all image frames throughout the present invention.

A deleting line is drawn keeping a predetermined distance from the tail end horse image in the preceding image, and all of the image portions behind said deleting line are set to 0 (black).

Figure 38:
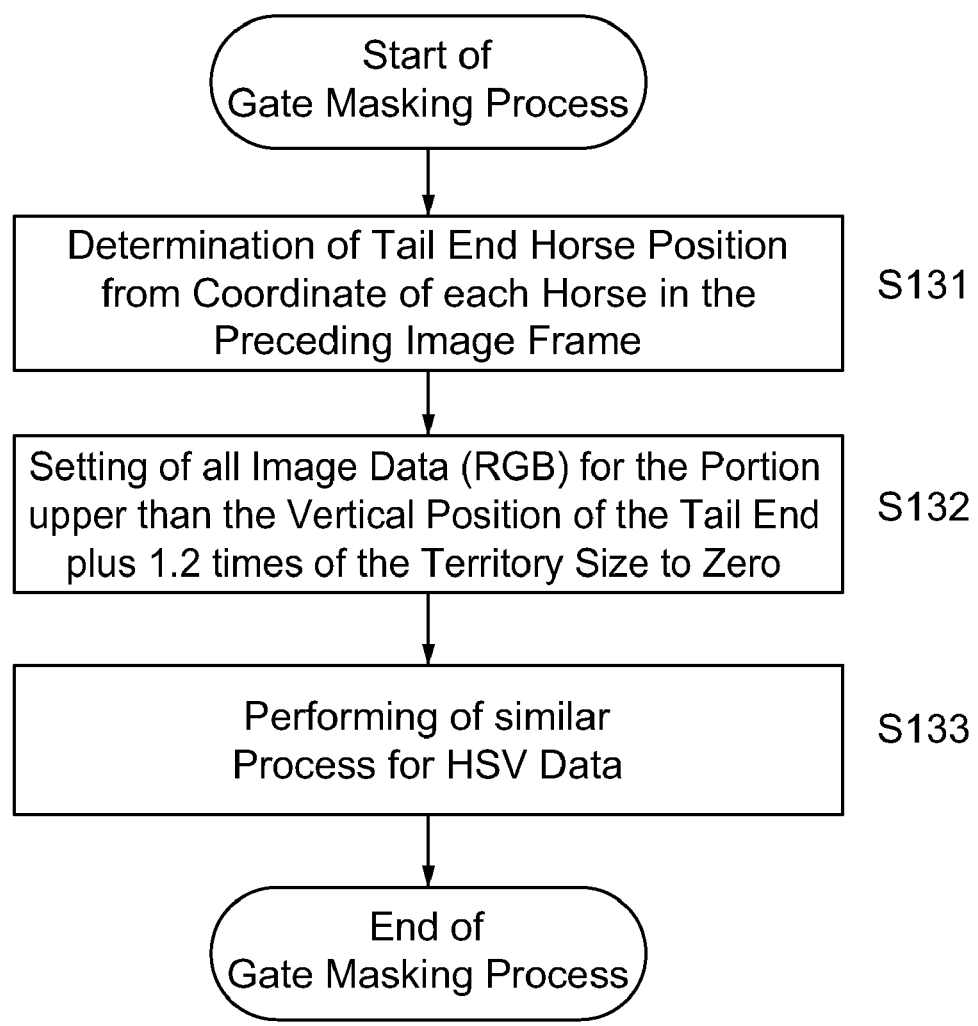
FIG. 38 is a detailed flow chart of S103 in FIG. 23.

At S132 in FIG. 38, the portion behind the horse at the tail end is cleared out with a margin, since the size of a horse changes according to the sizes of image frames to be processed. The territory in the figure means a value showing the size of the horse to the picture size, which is diverted from the processing result for the preceding image frame.

At S104, all image portions outside of Rachi (the fence that determines the race course) are further deleted from the image obtained at S103. A deleting line is set to a predetermined distance outside of Rachi, and all image portions outside of the deleting line are set to 0 (black). The reason why the deleting line is set to a predetermined distance outside of Rachi is the horse image may somewhat overlap on Rachi as shown also in FIG. 25. The prescribed distance is the margin for not removing the horse image.

As shown above, Rachi masking process detects the Rachi (fence) portion in the image and masks the image portions outside the Rachi portion. Performing this process eliminates most of unnecessary portions other than the race track, enabling accuracy improvement in the histogram process to be performed later.

In this way, unnecessary images are removed as noise from the original picture, and only the horse images and the green uniform lawn image are left.

Then, horse image exaction similar to the processes explained above is performed.

Namely, extraction of the image portion is performed by extracting the edge of color information of the horse and the jockey by clipping said image portion and applying masking process to it (S105). The size of the template is adjusted to the size that matches best said extracted clipped image. "Horse masking process" in the figure means a process of masking portions other than the portion where a horse exists, by using the tracking result for the preceding image frame.

Figure 29:
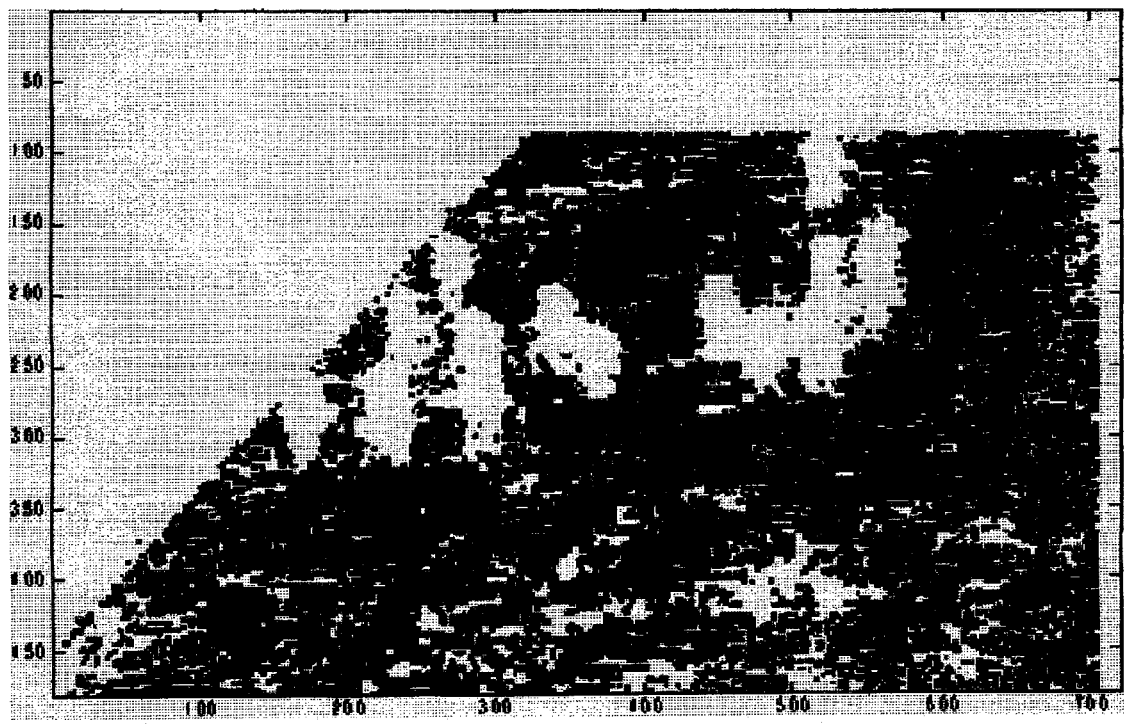
[FIG. 29] is an enlarged view of the image in FIG. 23.
Figure 30:
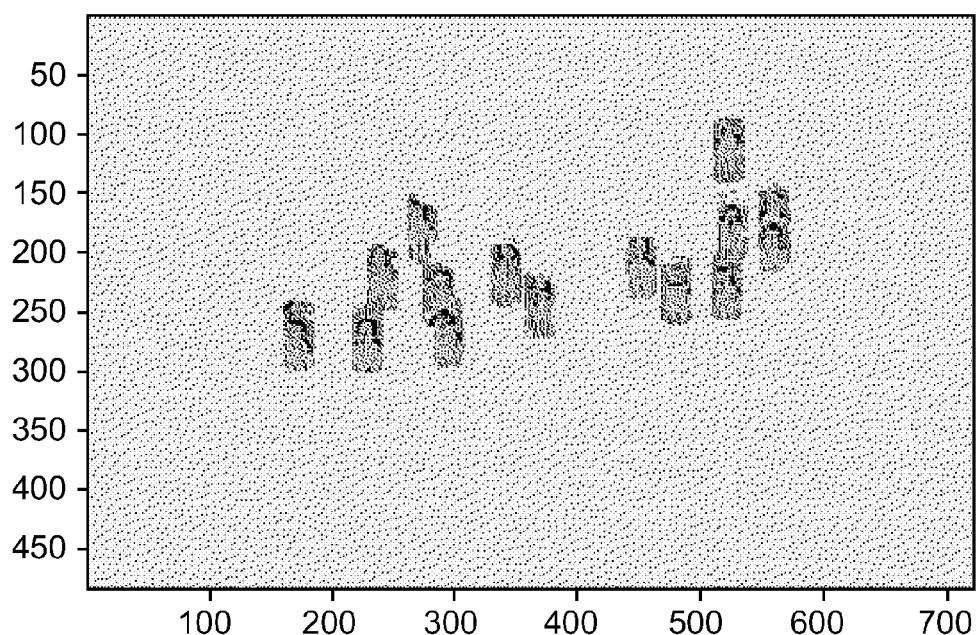
[FIG. 30] is an enlarged view of the image in FIG. 23.
Figure 31:
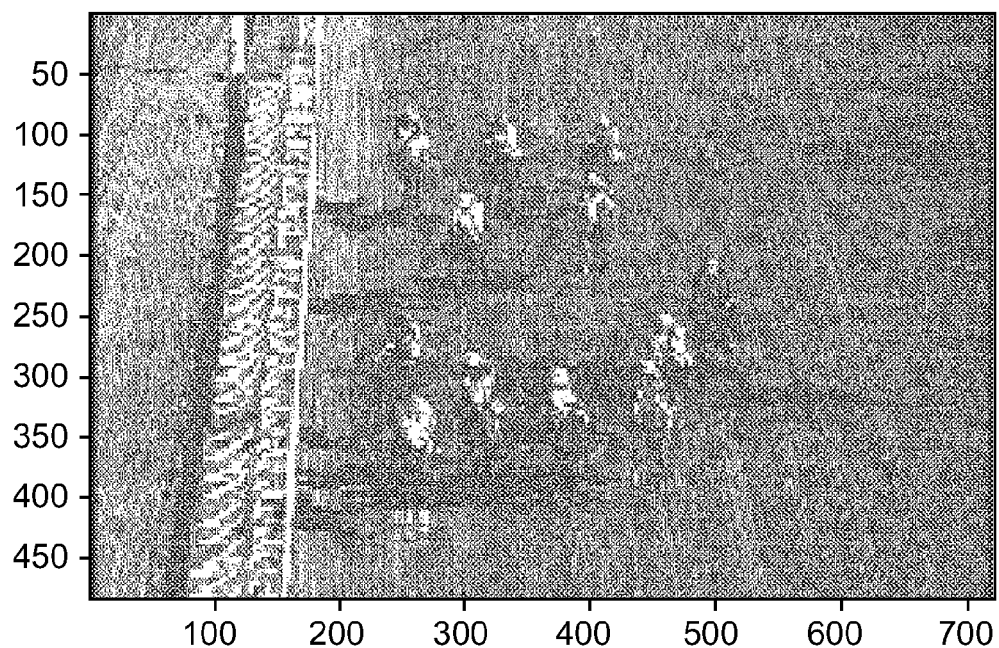
[FIG. 31] is an enlarged view of the image in FIG. 24.
Figure 32:
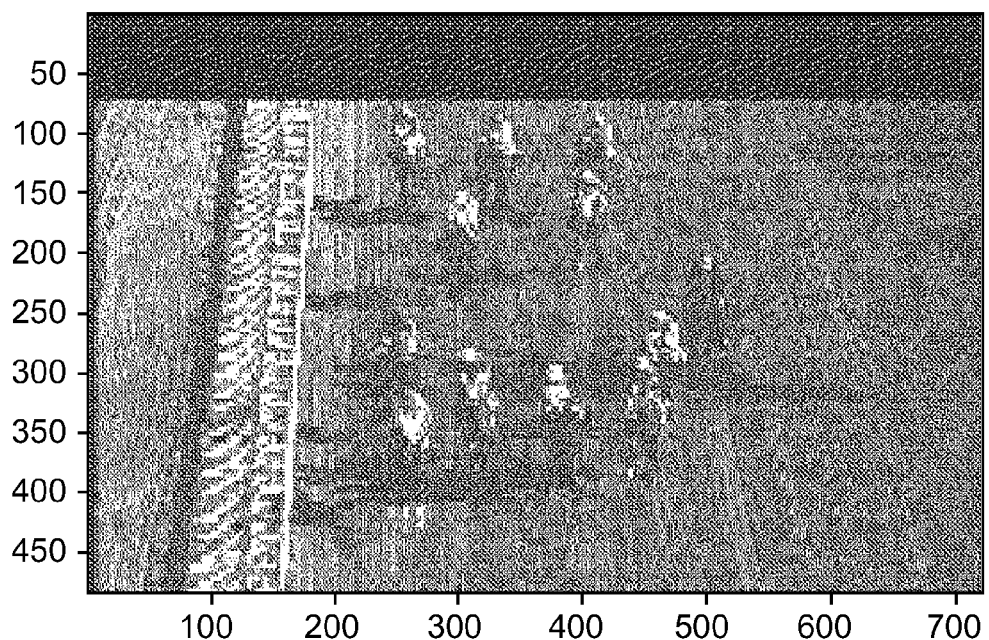
[FIG. 32] is an enlarged view of the image in FIG. 24.
Figure 33:
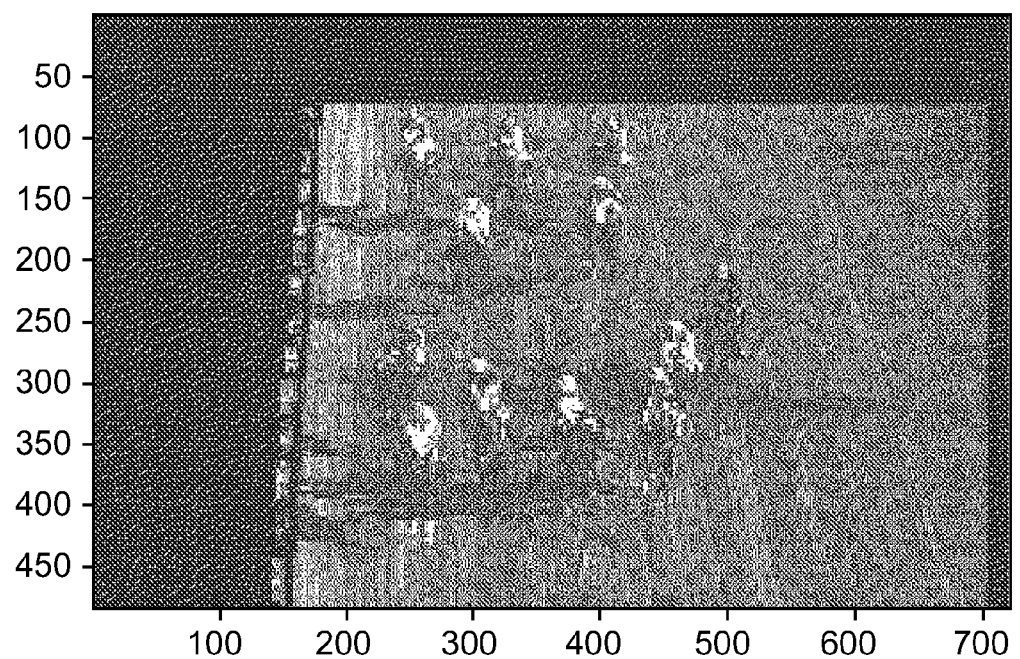
[FIG. 33] is an enlarged view of the image in FIG. 24.
Figure 34:
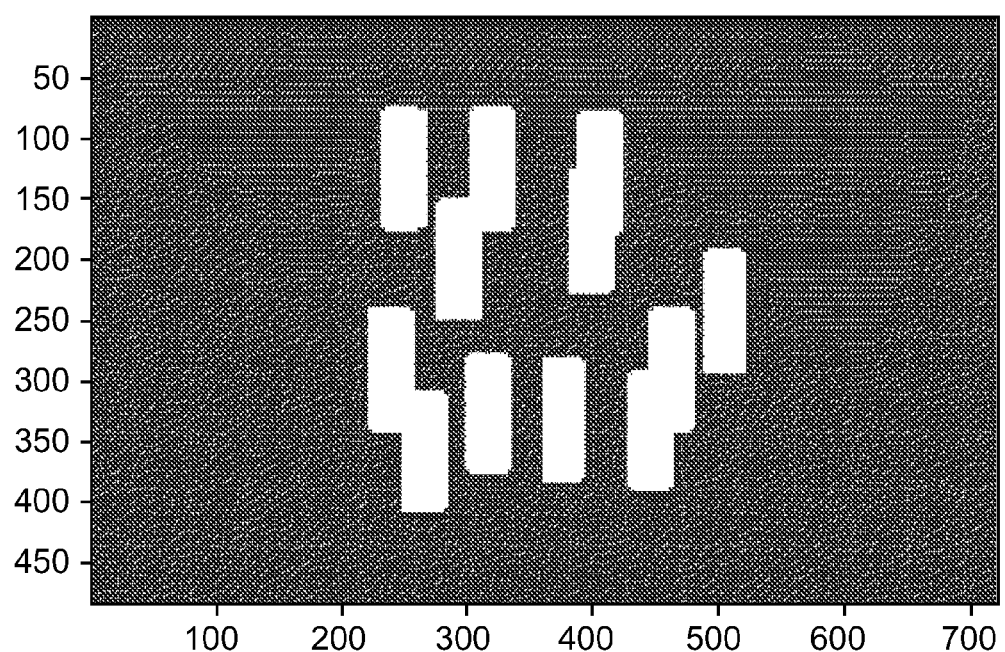
[FIG. 34] is an enlarged view of the image in FIG. 24.
Figure 35:
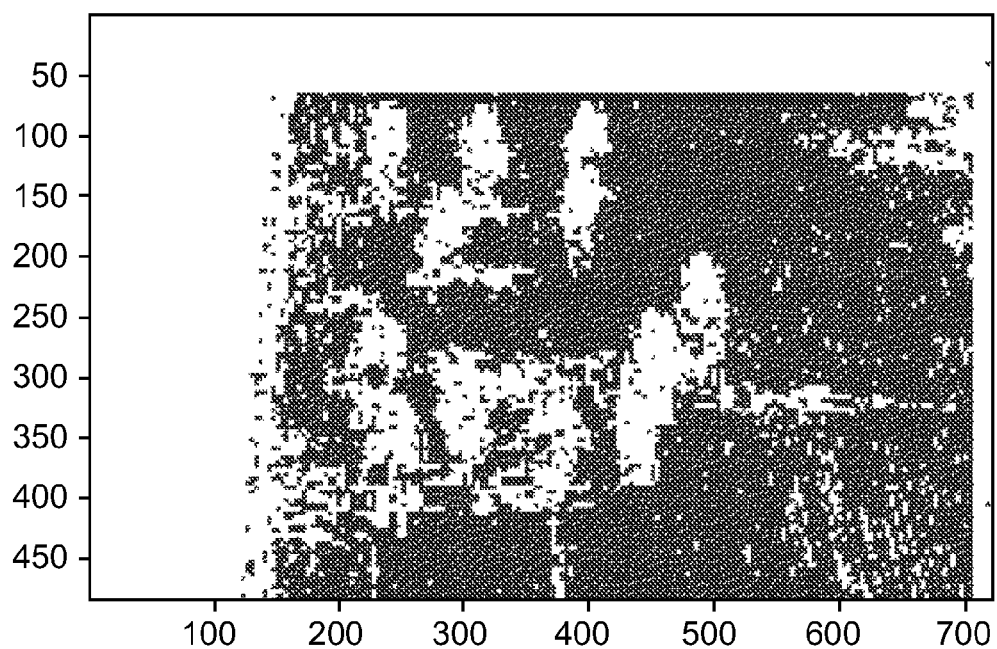
[FIG. 35] is an enlarged view of the image in FIG. 24.
Figure 36:
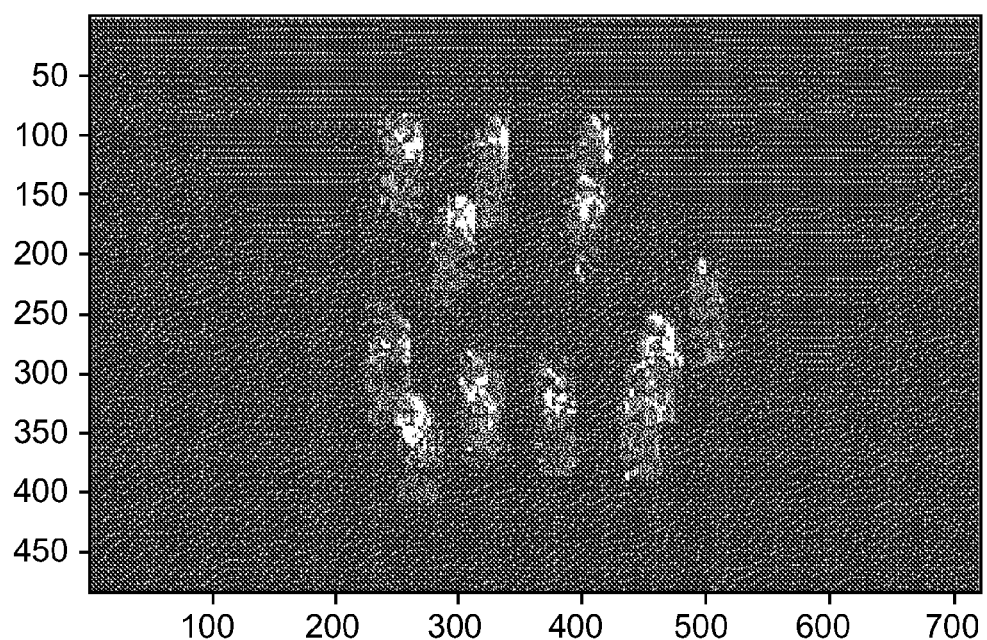
[FIG. 36] is an enlarged view of the image in FIG. 24.

Next, horse image extraction for the original image is performed as shown in FIG. 29 (S106). This process is newly added to the already explained algorithm.

This is a process of deleting the uniform green hue portion of the race course by using hue information (HSV information) of the original image.

This process is performed as follows;

RGB information on said images is changed into HSV information, a histogram is created from each component number of said HSV information, the ratio of the area of said clipping image and the area of the whole image is calculated, a threshold in said histogram by which the boundary between the clipping image and a background image is calculated according to said area ratio, and image information other than the background color is extracted from said image according to said threshold (S106).

Figure 42:
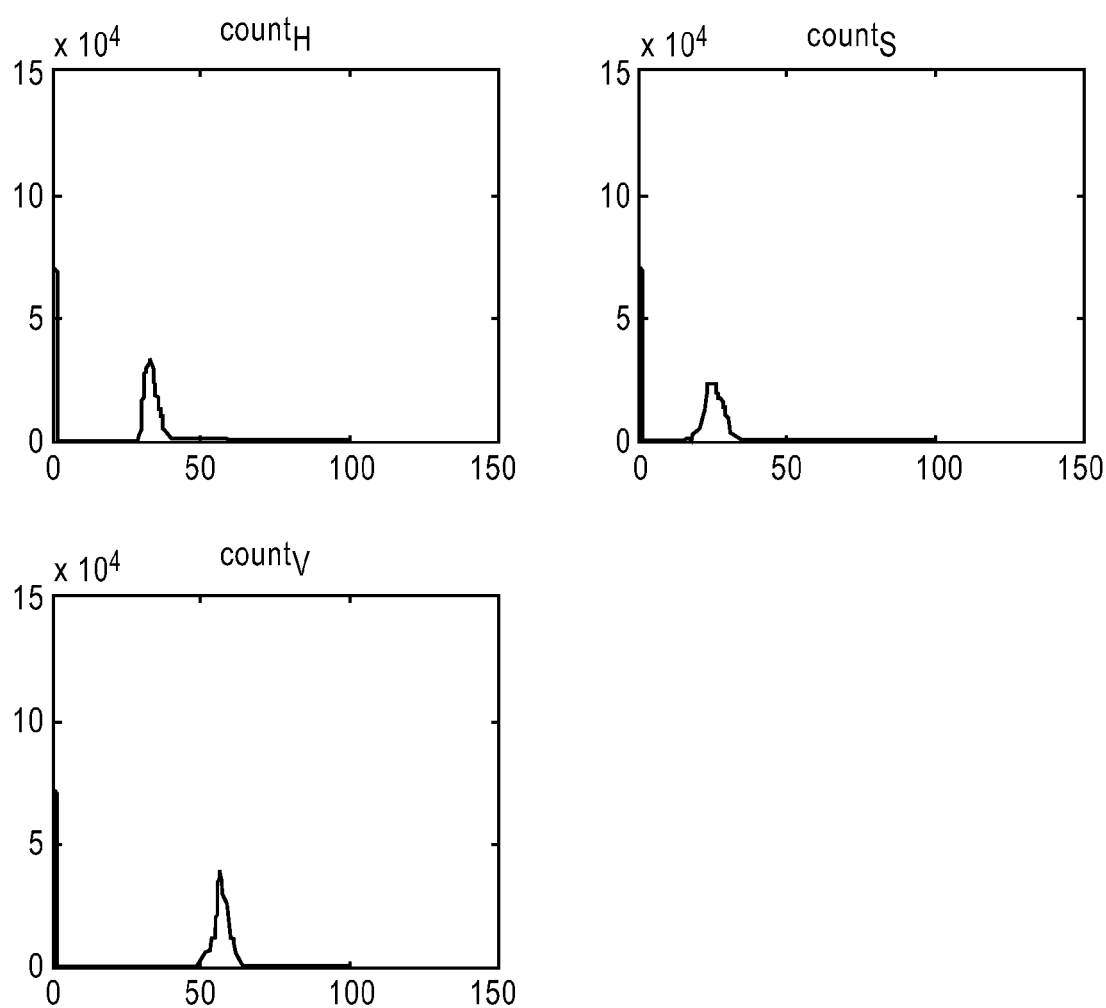
FIG. 42 shows an example of a histogram in S161 in FIG. 41.

Here, the histogram means a graphical chart showing a distribution of pixel numbers for the vertical axis and the pixel values for the horizontal axis, as shown in FIG. 42. In the case of the masking process histogram, pixel values of each pixel component are expressed by the horizontal axis, and pixel numbers having a pixel value of each pixel component is counted for the image under processing and plotted along the vertical axis. The portion of a peak in FIG. 42 expresses the pixel value which many number of pixels take, namely, the pixel value is the color value of the race track. That is, since the portion that forms the peak in FIG. 42 corresponds to the green lawn image, if said lawn image portion is blacked out by applying a threshold which is determined by the area ratio given by the following equation, only the hue information and the like for horse images will remain. This is shown as FIG. 30.

The formula of the threshold used as the reference ratio of masking is given by;

Threshold=(total pixel number−pixel number out of Rachi mask)*((white pixel number within horse masks/8)/black pixel number within Rachi mask).

The threshold value is obtained by calculating first pixel number in the portions except for outside of the race track (outside of Rachi), and by multiplying this value by the ratio between the horse portions and other portions with an original weight considered.

At S107 in FIG. 23, the template that matches the image size of said each horse, boat or the like is used for identification of each horse, boat or the like in said racing images, each horse or boat or the like is identified within said template, logical multiplication (AND) is calculated between the mask of the horse or the like that is obtained by said identification and said extracted image information other than background color, and noises other than clipping images of the horse or the like are cleared. Since noises other than the horse images existing on the lawn image in FIG. 29 can be removed by the procedure, accuracy in the horse image analysis is improved.

FIGS. 37-41 shows more detailed flow charts for S101 (feedback information loading), S102 (image loading), S103 (gate masking process), S104 (Rachi masking process) and S105 (horse masking process) in FIG. 23. In the case of the dirt track of FIG. 24 also, processing steps S111-S117 are the same as those of the lawn track (S101-S107) of FIG. 23, and these processing steps are confirmed to be effective also for the dirt track.

Figure 37:
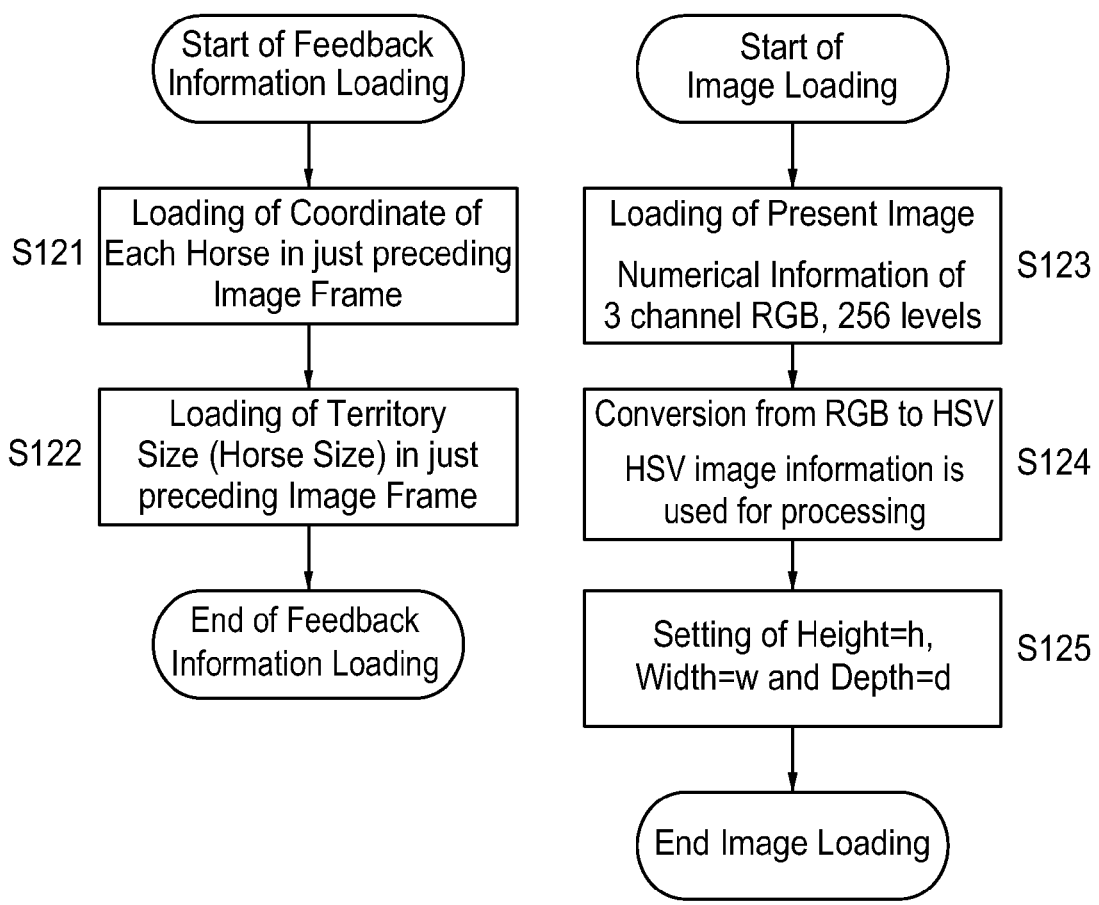
FIG. 37 is a detailed flow chart of S101, and S102 in FIG. 23.

In FIG. 37, the image of the preceding frame just before the present analysis target image among the consecutive image frames (S121) is loaded, and the size of the territory (size of the horse) in the preceding image frame is loaded (S122).

Next, the numerical RGB information of the image frame to be presently analyzed is loaded (S123), said RGB information is converted to HSV information (S124), and the height, the width and the depth of the image are set up (S125).

Next, in FIG. 38, the position of the tail end horse is determined from the coordinate of each horse in said preceding image frame (S131), and all of the image data (RGB) for the portion upper than the vertical position of the tail end plus 1.2 times of the territory size are set to zero. The similar masking process may be applied to the region ahead as required, if an unnecessary image exists there.

Figure 39:
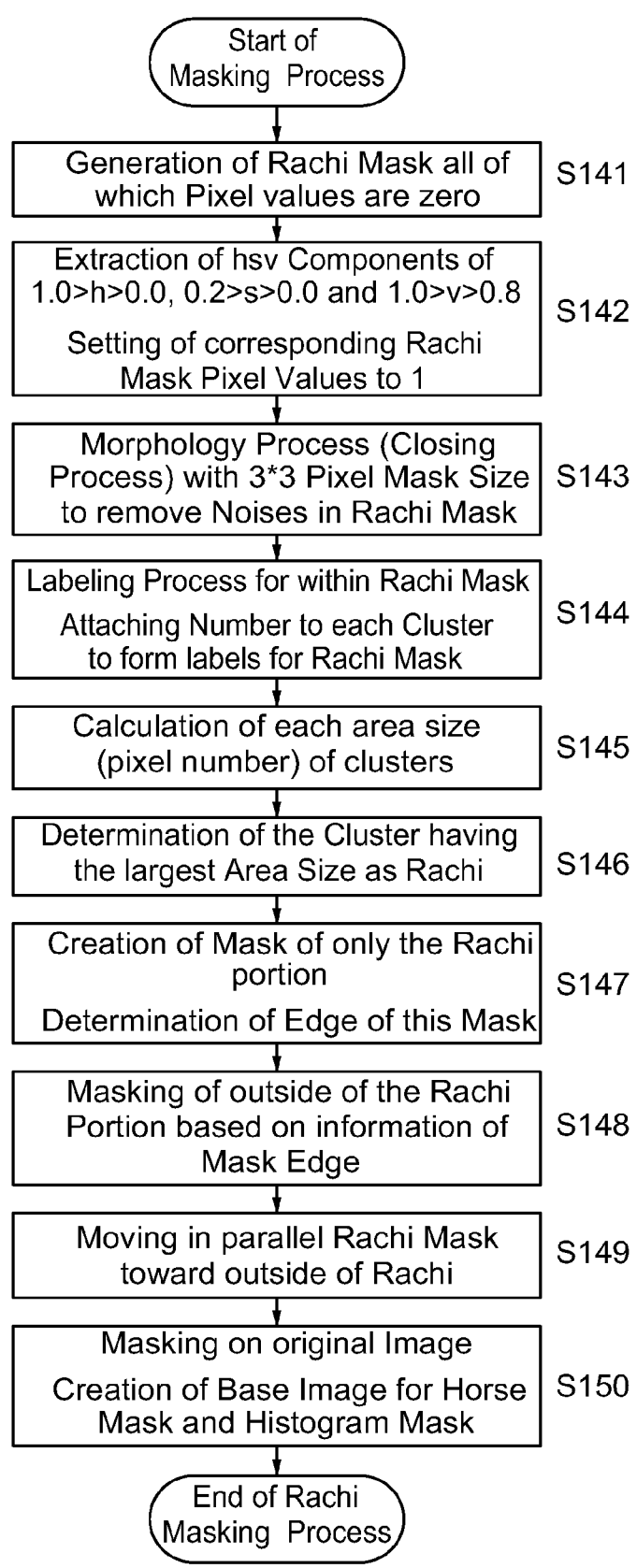
FIG. 39 is a detailed flow chart of S104 in FIG. 23.

Next, the process steps of Rachi masking process are shown in FIG. 39.

When the HSV components of images are extracted as shown in FIG. 15, in addition to images of horses, the image of Rachi (fence) is also extracted in the shape of a straight line. The Rachi portion is detected by the size (length) of said image of Rachi, and the position of Rachi portion in the present image frame is determined.

The steps are more specifically explained below.

All the pixel values are set to 0 at S141 in FIG. 39, and pixel values for the Rachi mask to which HSV components correspond are set to 1 (S142).

For said Rachi mask pixels, the morphology process (closing process) is performed to remove noises (S143), the labeling process is performed within the Rachi mask, a number is attached to each cluster to form labels for the Rachi mask (S144), each area size of all the clusters is calculated (S145), and the cluster having the largest area size is recognized as Rachi (S146).

The mask of only the Rachi portion is created, and the edge of this mask is determined (S147). Masking for outside of the Rachi portion is performed based on the information of said edge of the mask (S148), and moves said Rachi mask toward outside of Rachi (S149). This is for maintaining the horse image that overlaps the Rachi portion.

A histogram is created from the picture left behind to the present picture by performing the above-mentioned masking process (S150).

Figure 40:
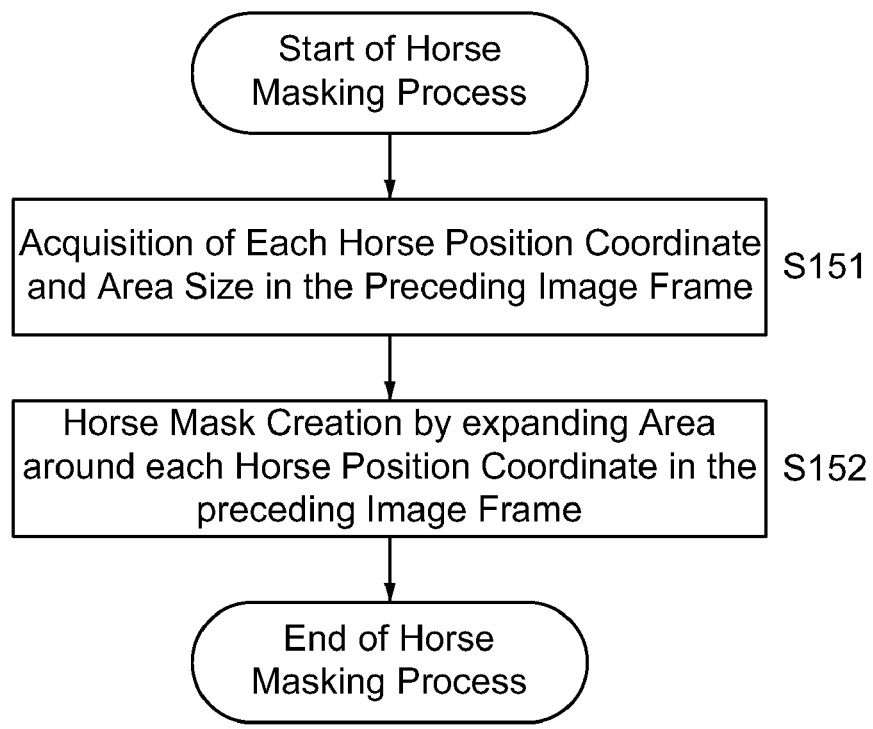
FIG. 40 is a detailed flow chart of S105 in FIG. 23.

The horse masking process of FIG. 40 is fundamentally the same as already proposed process.

That is, HSV conversion is performed for the present image, the horse position in the preceding image frame of is acquired (S151) and a horse mask of which area is an extended area of the horse position in said preceding image (S152).

Figure 41:
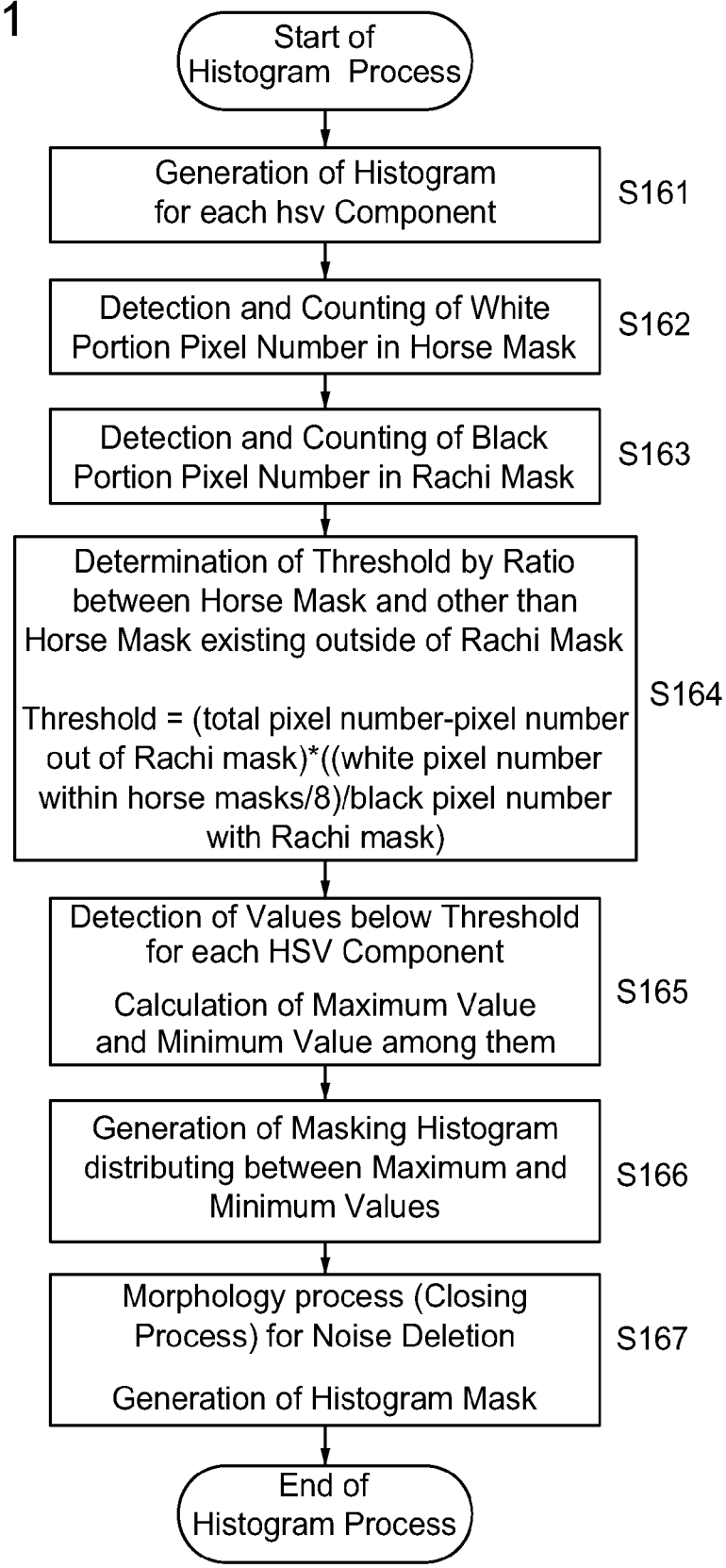
FIG. 41 is a detailed flow chart of S106 in FIG. 23.

Details of said histogram process are shown in FIG. 41.

In the histogram process, by using the image frame where images except for the race track portion are deleted as the basis of the process, a histogram is created for each color component for the frame, and the peak portion (race track color portion) is removed by using the value calculated from the formula of the threshold. Thus, this process can masks the race track color portion efficiently.

Here, the histogram means a graphical chart showing a distribution of pixel numbers for the vertical axis and the pixel values for the horizontal axis, as shown in FIG. 42. In the case of the masking process histogram, pixel values of each pixel component are expressed by the horizontal axis, and pixel numbers having a pixel value of each pixel component is counted for the image under processing and plotted along the vertical axis.

The portion of a peak in the figure expresses the pixel value which many number of pixels take, namely, the pixel value is the color value of the race track.

The formula of the threshold used as the reference ratio of masking is given by;

Threshold=(total pixel number−pixel number out of Rachi mask)*((white pixel number within horse masks/8)/black pixel number within Rachi mask).

The threshold value is obtained by calculating first pixel number in the portions except for outside of the race track (outside of Rachi), and by multiplying this value by the ratio between the horse portions and other portions with an original weight considered.

In FIG. 41, after generating the histogram (S161), the white portion pixel number in a horse mask and the black portion pixel number in the Rachi mask are respectively detected and counted (S162, S163), a threshold is determined by the ratio between the horse mask and other than the horse mask existing outside of the Rachi mask (S164), values below the threshold for each HSV component are detected, the maximum value and the minimum value among them are calculated (S165), and masking histograms distributing between said maximum and minimum values are generated (S166). The morphology process is applied to the results for noise deletion to complete the histograms (S167).

FIG. 42 shows histogram examples obtained by the process explained above.

FIG. 42 shows histograms corresponding to each of H-S-V components, with each horizontal axis: for each pixel component value (H/S/V) is multiplied by 100 for expression by integer number, and with each vertical axis: for the pixel numbers having each pixel component value.

In FIG. 42, shown are;
upper-left: histogram for only H component,
upper-right: histogram for only S component and
lower-left: histogram for only V component.

INDUSTRIAL APPLICABILITY

According to the present invention, progress of a race (trails of each horse in a race) which was conventionally difficult to obtain can be easily obtained, and commercialization is expected since needs are high.

Moreover, by delivering only a small amount of data for reproducing racing image at the receiving side, the racing status can be enjoyed visually even by a cellular phone or the like, which improves service for horse race fans and increases sales of horse races, and can generate new industrial demand (data distribution).

Also, horse position information analysis with a higher accuracy and a shorter calculation time becomes possible by using the improved image extraction method of the present invention.

Prompt provision of course taking information for each horse after a race not only becomes good judging data but also improves service for horse race fans and becomes an important tool for increasing horse race fans.

What is claimed is:

1. A position information analyzing and displaying method for each horse or boat wherein, for continuously captured race images, said method identifies each horse or boat by similarity analysis, tracks continuously the trail of each horse or boat in said racing images, analyzes said position information of each horse or boat by using the positional relationship with the fixed position information of a racetrack or a motorboat race place in said images, and displays the trails of each horse or boat, wherein, clipping images of each horse or boat are extracted from said continuously captured race images, by deleting unnecessary portions other than the race course from the images.

2. The position information analyzing and displaying method for each horse or boat claimed in claim 1 wherein said identification using said similarity uses recognition using high order local autocorrelation characteristics.

3. The position information analyzing and displaying method for each horse or boat claimed in claim 1 wherein a template that matches the image size of said each horse or boat is used for identification of each horse or boat in said racing images, each horse or boat is identified within said template, and identification of each horse or boat is performed within said template.

4. The position information analyzing and displaying method for each horse or boat claimed in claim 3 wherein said template is hexagonal and the size of said template is variable according to the size of each horse or boat on the image.

5. The position information analyzing and displaying method for each horse or boat claimed in claim 4 wherein the size of said template is determined by performing said recognition using color information for the horse or boat image to determine the clipping area in a search area larger than said template size, and by determining the size of said template in the clipping area according to the size that matches to the image of each horse or boat.

6. The position information analyzing and displaying method for each horse or boat claimed in claim 3 wherein in said template, only the upper portion except for leg portion of a horse is used as the area for similarity analysis.

7. The position information analyzing and displaying method for each horse claimed in claim 3 wherein in said template, areas corresponding to the head of each horse and the head of each jockey are weighted for the similarity analysis.

8. A race trail displaying method wherein said method displays a race trail of each horse or boat in the race by analyzing said position information of each horse or boat by using position information analysis method for each horse or boat using the position information analyzing method for each horse or boat claimed in claim 1, and by displaying continuously said position information of each horse or boat.

9. A race trail displaying method wherein race trail data used for said race trail displaying method claimed in claim 8 is delivered to a personal computer, a personal digital assistant or a cellular phone via the Internet, the race progress is reproduced using said delivered data, and the reproduced animated racing image is displayed on the personal computer, the personal digital assistant or the cellular phone.

10. The position information analyzing and displaying method for each horse or boat claimed in claim 1, wherein among the position coordinates of each horse or boat in said preceding picture in the continuously captured race images, all image information for the area of a specified position behind the tail end horse position is set to zero as said unnecessary portion.

11. The position information analyzing and displaying method for each horse or boat claimed in claim 1, wherein a Rachi portion is extracted from said continuously captured race images and all image information outside of said Rachi is set to 0.

12. The position information analyzing and displaying method for each horse or boat claimed in claim 1, wherein RGB information on said images is changed into HSV information, a histogram is created from each component number of said HSV information, the ratio of the area of said clipping image and the area of the whole image is calculated, a threshold in said histogram by which the boundary between the clipping image and a background image is calculated according to said area ratio, and image information other than the background color is extracted from said image according to said threshold.

13. The position information analyzing and displaying method for each horse claimed in claim 12 wherein the template that matches the image size of said each horse is used for identification of each horse in said racing images, each horse is identified within said template, logical multiplication is calculated between the mask of the horse that is obtained by said identification and said extracted image information other than background color, and noises other than clipping images of the horse are cleared.

14. The position information analyzing and displaying method for each horse or boat claimed in claim 1, wherein said method compares said identification information of each horse or boat on each picture with identification information of each horse or boat on the following picture, and identifies the object in the following picture that has large similarity with the object in the preceding picture as the same horse or the same boat.

15. The position information analyzing and displaying method for each horse or boat claimed in claim 14 wherein said template is hexagonal and the size of said template is variable according to the size of each horse or boat on the image.

16. The position information analyzing and displaying method for each horse or boat claimed in claim 15, wherein the size of said template is determined by performing said recognition using color information for the object image to determine the clipping area in a search area larger than said template size, and by determining the size of said template in the clipping area according to the size that matches to the image of each horse or boat.

17. The position information analyzing and displaying method for each horse claimed in claim 15 wherein in said template, only the upper portion except for leg portion of a horse is used as the area for similarity analysis.

18. The position information analyzing and displaying method for each horse claimed in claim 15 wherein in said template, areas corresponding to the head of each horse and the head of each jockey are weighted for the similarity analysis.

* * * * *